United States Patent
Magri et al.

(10) Patent No.: US 9,425,900 B2
(45) Date of Patent: Aug. 23, 2016

(54) CHROMATIC DISPERSION PROCESSING APPARATUS AND METHOD

(75) Inventors: Roberto Magri, Parma (IT); Raffaele Corsini, Milan (IT); Ernesto Ciaramella, Rome (IT); Emma Matarazzo, Avellion (IT); Andrea Peracchi, Salsomaggiore Terme (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 148 days.

(21) Appl. No.: 14/382,536

(22) PCT Filed: Mar. 2, 2012

(86) PCT No.: PCT/EP2012/053622
§ 371 (c)(1),
(2), (4) Date: Apr. 30, 2015

(87) PCT Pub. No.: WO2013/127467
PCT Pub. Date: Sep. 6, 2013

(65) Prior Publication Data
US 2015/0229410 A1   Aug. 13, 2015

(51) Int. Cl.
*H04B 10/61* (2013.01)
*H04B 10/079* (2013.01)
(Continued)

(52) U.S. Cl.
CPC ...... *H04B 10/6161* (2013.01); *H04B 10/07951* (2013.01); *H04B 10/25133* (2013.01); *H04B 10/6971* (2013.01); *H04L 27/01* (2013.01)

(58) Field of Classification Search
CPC ..................... H04B 10/6161; H04B 10/07951; H04B 10/25133; H04B 10/6971; H04L 27/01
USPC .......................................................... 398/26
See application file for complete search history.

(56) References Cited

U.S. PATENT DOCUMENTS

2010/0329698 A1* 12/2010 Nakashima ............ H04B 10/60
398/208
2011/0064421 A1*  3/2011 Zhang ................ H04B 10/6161
398/208

(Continued)

FOREIGN PATENT DOCUMENTS

| JP | 2011015013 A | 1/2011 |
|---|---|---|
| WO | WO 2010/094342 A1 | 8/2010 |
| WO | WO 2010/108334 A1 | 9/2010 |

OTHER PUBLICATIONS

Liu et al, "A Simple, Robust, and Wide-range Chromatic Dispersion Monitor in Coherent Receivers", Mar. 2009, OAS/OFC/NFOEC 2009, IEEE.*

(Continued)

*Primary Examiner* — Dalzid Singh
(74) *Attorney, Agent, or Firm* — NDWE LLP

(57) ABSTRACT

Chromatic dispersion (CD) processing apparatus comprises an equalizer loop comprising: a frequency domain equalizer (FDE) arranged to receive samples of an electrical representation of an optical communications signal having CD and to apply CD compensation to the samples, to form dispersion corrected samples having a residual CD value; a time domain equalizer arranged to receive the corrected samples and to generate a representation of a channel linear transfer function of the signal from the corrected samples, to generate and transmit a monitoring signal comprising said representation; optical performance monitoring apparatus arranged to receive the monitoring signal and to estimate the residual CD value; and a processor arranged to receive the estimated residual value and to compare it to a threshold value and to generate and transmit to the FDE an estimation signal comprising the estimated value unless it is less than the threshold.

18 Claims, 15 Drawing Sheets

(51) Int. Cl.
*H04B 10/2513* (2013.01)
*H04B 10/69* (2013.01)
*H04L 27/01* (2006.01)

(56) References Cited

U.S. PATENT DOCUMENTS

2012/0106971 A1* 5/2012 Sugaya ............... H04J 14/0279
398/97
2012/0114341 A1* 5/2012 Hu .................. H04B 10/25133
398/208
2013/0051793 A1* 2/2013 Magri ............... H04B 10/2569
398/25

OTHER PUBLICATIONS

Hauske, et al., "Frequency Domain Chromatic Dispersion Estimation", *2010 Optical Society of America; 2010 IEEE*, (2010), 3 pages.

Ishihara, et al., "Coherent Optical Transmission with Frequency-domain Equalization", *ECOC, IEEE*, vol. 3, (Sep. 21-25, 2008), pp. 125-126.

Kuang, et al., "Real-time measurements of a 40 Gb/s coherent system", vol. 16, No. 2, *Optics Express, Optical Society of America*, (Jan. 21, 2008), pp. 874- 879.

Kuschnerov, et al., "Adaptive Chromatic Dispersion Equalization for Non-Dispersion Managed Coherent Systems", *Optical Society of America, IEEE*, (2009), 3 pages.

Kuschnerov, et al., "DSP for Coherent Single-Carrier Receivers", *Journal of Lightwave Technology*, vol. 27, No. 16, (Aug. 15, 2009), pp. 3614-3622.

Savory, Seb J., "Digital filters for coherent optical receivers", *Optical Society of Americas, Optics Express*, vol. 16, No. 2, (Jan. 21, 2008), pp. 804-817.

Spinnler, et al., "Adaptive Equalizer Complexity in Coherent Optical Receivers", *IEEE* vol. 3, *ECOC 2008*, (Sep. 21-25, 2008), pp. 127-128.

Taylor, Michael G., "Coherent Detection Method Using DSP for Demodulation of Signal and Subsequent Equalization of Propagation Impairments", *IEEE Photonics Technology Letters*, vol. 16, No. 2, (Feb. 2004), pp. 674-676.

Wang, et al., "Adaptive Chromatic Dispersion Compensation for Coherent Communication Systems Using Delay-Tap Sampling Technique", *IEEE Photonics Technology Letters*, vol. 23, No. 14, (Jul. 15, 2011), pp. 1016-1018.

"PCT International Search Report and Written Opinion for Counterpart PCT Application No. PCT/EP2012/053622," Oct. 26, 2012, 8 pages.

Giulio Colavolpe et al., "Robust Multilevel Coherent Optical Systems With Linear Processing at the Receiver," 2009, pp. 2357-2369, Journal of Lightwave Technology, vol. 27, No. 13, Jul. 1, 2009, IEEE.

Tianhua Xu et al., "Chromatic dispersion compensation in coherent transmission system using digital filters," 2010, pp. 16243-16257, Optics Express, vol. 18, No. 15, Jul. 19, 2010, Optical Society of America.

International Preliminary Report on Patentability, Application No. PCT/EP2012/053622, dated Sep. 12, 2014, 7 pages.

Notice of Reasons for Rejection, JP Application No. 2014-559108, dated Nov. 10, 2015, 6 pages.

Ling Liu et al., "A Simple, Robust, and Wide-range Chromatic Dispersion Monitor in Coherent Receivers," Mar. 2009, 4 pages, OAS/OFC/NFOEC 2009, IEEE.

* cited by examiner

CHROMATIC DISPERSION PROCESSING APPARATUS AND METHOD

CROSS-REFERENCE TO RELATED APPLICATIONS

This application is a National stage of International Application No. PCT/EP2012/053622, filed Mar. 2, 2012, which is hereby incorporated by reference.

TECHNICAL FIELD

The invention relates to chromatic dispersion processing apparatus, an optical receiver, optical monitoring apparatus, and a method of processing chromatic dispersion of an optical communications signal.

BACKGROUND

Optical transmission schemes based on coherent detection and digital signal processing (DSP) of polarization division multiplexing (PDM) multilevel modulation formats, are attracting more attention and are being considered for next generation optical networks. The main advantage of coherent receivers is that they provide both amplitude and phase information of a received optical signal. This information is used by a DSP-based equalizer to invert the channel linear transfer function in order to recover the transmitted signal. Hence, the digital equalizer compensates for all linear channel impairments, namely chromatic dispersion (CD) and polarization mode dispersion (PMD). This is particularly true in the weakly non-linear regime of typical optical systems.

CD and PMD compensation can be obtained using a single time domain equalizer (TDE), provided that the channel memory is less than the TDE length. The inter-symbol interference (ISI) caused by PMD is typically limited, so the number of taps required in the TDE to compensate for PMD is low. In contrast, the channel memory induced by residual CD can be very long, so a high taps number is required in a TDE to compensate for CD. Another approach exploits a reduced complexity TDE, which compensates for PMD, combined with a frequency domain equalizer (FDE) which performs CD compensation. In the FDE, the signal is transformed by a Fast Fourier Transform (FFT) and multiplied by the inverse of the dispersive channel transfer function. The advantage of this solution is that the computational complexity of an FDE is lower than a TDE even for a small number of taps. However using an FDE necessitates prior knowledge of the residual CD value of the channel. In most cases, the CD is assumed to be a known quantity and is preset in the FDE. However the CD of a transmission link across an optical network can change due to dynamic switching and rerouting of the signal, which means that the uncompensated residual CD of the link is unknown. An adaptive CD compensation is therefore needed to cope with the dynamic changes of light paths in an optical network. Reported solutions to this include delay tap sampling, minimum mean-squared error (MMSE) equalizer assisted by channel estimation from a training sequence, overlap frequency domain equalizer (OFDE) with a blind estimation algorithm operating in the time or frequency domain, and using time domain least mean square (LMS) adaptive filters. These proposed solutions have various complexities, including requiring the use of a look up table, the need for a training sequence, an "Ad hoc" block to perform CD estimation, and a high number of taps for effective CD compensation.

An optical performance monitoring (OPM) algorithm, for coherent optical receivers, based on the elaboration of the TDE tap coefficients to provide fiber linear parameters information has been proposed by T. Xu et al, "Chromatic dispersion compensation in coherent transmission system using digital filters", Optics Express, vol. 18, no. 15, pp. 16243-16257, 2010. However, in order to perform a CD estimation with good accuracy, this approach requires the use of a TDE with a high number of taps, even higher than the number of taps required by the system to reach an error free condition, further increasing the computational complexity of the TDE.

SUMMARY

It is an object to provide an improved chromatic dispersion processing apparatus. It is a further object to provide an improved method of processing chromatic dispersion of an optical communications signal. It is a further object to provide an improved optical receiver. It is a further object to provide an improved optical monitoring apparatus.

A first aspect of the invention provides chromatic dispersion processing apparatus comprising an equalizer loop. The equalizer loop comprises a frequency domain equaliser, a time domain equaliser, optical performance monitoring apparatus and a processor. The frequency domain equaliser is arranged to receive samples of an electrical representation of an optical communications signal having a chromatic dispersion. The frequency domain equaliser is arranged to apply chromatic dispersion compensation to the samples, to form dispersion corrected samples having a residual chromatic dispersion value. The time domain equaliser is arranged to receive the dispersion corrected samples and to generate a representation of a channel linear transfer function of the optical communications signal from the dispersion corrected samples. The time domain equaliser is arranged to generate and transmit a monitoring signal comprising the representation of the channel linear transfer function. The optical performance monitoring apparatus is arranged to receive the monitoring signal and to estimate the residual chromatic dispersion value from the representation of the channel linear transfer function. The processor is arranged to receive the estimated residual chromatic dispersion value and to compare the estimated residual chromatic dispersion value to a threshold value. The processor is arranged to generate and transmit to the frequency domain equaliser an estimation signal comprising the estimated residual chromatic dispersion value unless the estimated residual chromatic dispersion value is less than the threshold value.

The chromatic dispersion processing apparatus may be used to process chromatic dispersion in the form of compensating for chromatic dispersion and/or estimating chromatic dispersion.

The equalizer loop arrangement of the frequency domain equaliser, time domain equaliser and optical performance monitoring apparatus may enable the chromatic dispersion processing apparatus to compensate for chromatic dispersion of an optical communications signal without any knowledge of the chromatic dispersion characteristic of an optical communications link from which the optical communications signal is received. The chromatic dispersion processing apparatus may exploit blind equalisation in the time domain equaliser and low computational complexity in the frequency domain equaliser to jointly compensate for chromatic dispersion and estimate chromatic dispersion quickly and effectively. Arranging the frequency domain equaliser, time domain equaliser and optical performance monitoring apparatus in an equaliser loop may enable the time domain equaliser to operate at an optimised load and to have greater margins for variations. The chromatic dispersion processing apparatus may provide a chromatic dispersion estimation which is more accurate than is achievable with the prior art and which operates more quickly since it operates without the need for look up tables or training sequences for the time domain equaliser.

In an embodiment, the equalizer loop is arranged to operate iteratively until the estimated residual chromatic dispersion value is less than the threshold value. The chromatic dispersion processing apparatus may therefore operate blindly and adaptively.

In an embodiment, the time domain equaliser is arranged to generate an inverted channel linear transfer function of the optical communications signal from the dispersion corrected samples and to apply the inverted channel linear transfer function to the dispersion corrected samples, to form dispersion compensated samples. The chromatic dispersion processing apparatus is therefore able to compensate for chromatic dispersion of the samples, to form dispersion compensated samples.

In an embodiment, the time domain equaliser comprises a two-dimensional fractionally spaced feed forward equaliser having a number of taps in the range 5 to 15. The number of taps is fewer than the number of taps required for the time domain equaliser to fully compensate for the chromatic dispersion of the optical communications signal. The chromatic dispersion processing apparatus is therefore based on a frequency domain equaliser, a low complexity time domain equaliser and optical performance monitoring apparatus arranged in an equaliser loop.

In an embodiment, the time domain equaliser comprises a two-dimensional fractionally spaced feed forward equaliser having 5 taps. A very low number of taps may therefore be used to achieve convergence of the estimated residual chromatic dispersion with the threshold value.

In an embodiment, each tap has a tap coefficient and the time domain equaliser is arranged to apply the minimum mean square error, MMSE, criterion to adapt the tap coefficients in order to converge its operation to a two-dimensional matched filter, as reported by G. Colavolpe et al, "Robust multilevel coherent optical systems with linear processing at the receiver," J. Lightwave Technol, vol. 27, no. 13, pages 2357-2369, 2009.

In an embodiment, the frequency domain equaliser is arranged to compensate the samples for an initial value of chromatic dispersion. The frequency domain equaliser is arranged, in response to receipt of a said estimation signal, to compensate the samples for a subsequent value of chromatic dispersion. The subsequent value is the sum of the initial value and of the respective estimated residual chromatic dispersion value of the said estimation signal and of each previously received estimation signal.

In an embodiment, the initial value is one of 0 ps/nm, a known minimum chromatic dispersion accumulated by the optical communications signal, and a known chromatic dispersion of a link of an optical communications network from which the optical communications signal is received. Setting the initial value to 0 ps/nm may enable the chromatic dispersion processing apparatus to operate completely blind to the chromatic dispersion of the link from which the optical communications signal is received. This may enable the chromatic dispersion processing apparatus to operate in a very general manner with minimal user input. If the chromatic dispersion accumulated by the optical communications signal during propagation is known to range between a known minimum and maximum value, the initial value may be set to the known minimum value. This may enable faster convergence of the time domain equaliser than when operating completely blind. A known chromatic dispersion of the link from which the optical communications signal is received may be provided from the control plane of the communications network. This may also enable faster convergence of the time domain equaliser than when operating completely blind.

In an embodiment, the chromatic dispersion processing apparatus further comprises bit error rate monitoring apparatus arranged to determine a bit error rate of the dispersion compensated samples. The processor is arranged to receive the bit error rate and to compare the bit error rate to a first threshold bit error rate. The processor is arranged iteratively to cause a preselected chromatic dispersion increment to be added to the value of chromatic dispersion previously compensated for unless the bit error rate is less than the first threshold bit error rate.

In an embodiment, the chromatic dispersion increment is selected in dependence on a bit rate and modulation format of the optical communications signal and on the number of taps of the time domain equaliser. In an embodiment, the chromatic dispersion increment is less than 1000 ps/nm.

In an embodiment, the bit error rate monitoring apparatus comprises a forward error correction device.

In an embodiment, the processor is arranged, in response to the bit error rate being less than the first threshold bit error rate, to compare the bit error rate to a second threshold bit error rate. The processor is arranged to generate and transmit the estimation signal comprising the estimated residual chromatic dispersion value unless the bit error rate is less than the second threshold bit error rate and the estimated residual value is less than the threshold value.

When the bit error rate is less than the second threshold bit error rate and the estimated residual value is less than the threshold value the majority of the chromatic dispersion has been compensated for by the frequency domain equaliser. The time domain equaliser is required only to compensate for a minimum chromatic dispersion, defined by the threshold value. The time domain equaliser may therefore invert the channel linear transfer function with a very good approximation with a very low number of taps. This may improve the robustness of the chromatic dispersion processing apparatus to sudden changes in chromatic dispersion.

In an embodiment, the threshold value is in the range 10 ps/nm to 50 ps/nm. In an embodiment, the threshold value is 10 ps/nm. The lower the threshold value, the greater is the amount of chromatic dispersion that is compensated for by the frequency domain equaliser but the higher is the number of iterations required. A threshold value of 10 ps/nm may provide both accuracy of the estimated residual chromatic dispersion and an acceptable number of iterations.

In an embodiment, first threshold bit error rate is 0.48. This may allow the time domain equaliser to converge and the optical performance monitoring apparatus to output a useful value of estimated residual chromatic dispersion.

In an embodiment, second threshold bit error rate is $1.0 \times 10^{-3}$.

In an embodiment, the optical performance monitoring apparatus is arranged to generate and transmit an output signal comprising an indication of the estimated residual chromatic dispersion value.

In an embodiment, the optical communications signal comprises an optical communications traffic signal. In an embodiment, the optical communications signal comprises a portion of an optical communications traffic signal.

A second aspect of the invention provides a method of processing chromatic dispersion of an optical communications signal. The method comprises step a. of receiving samples of an electrical representation of an optical communications signal having a chromatic dispersion. The method comprises step b. of compensating the samples for a value of chromatic dispersion, to form dispersion corrected samples having a residual chromatic dispersion value. The method comprises step c. of generating a representation of a channel linear transfer function of the optical communications signal from the dispersion corrected samples. The method comprises step e. of estimating the residual chromatic dispersion value from the representation of the channel linear transfer function. The method comprises step f. of comparing the estimated residual chromatic dispersion value to a threshold value and unless it is less than the threshold value adding the estimated residual chromatic dispersion value to the value of chromatic dispersion previously compensated for, to form a subsequent value of chromatic dispersion. The method comprises step g. of repeating steps b. to f. for respective subsequent values of chromatic dispersion until the estimated residual chromatic dispersion value is less than the threshold value.

The method may be used for chromatic dispersion processing in the form of compensating for chromatic dispersion compensation and/or estimating chromatic dispersion. The iterative operation of the method may enable chromatic dispersion of an optical communications signal to be compensated for without any knowledge of the chromatic dispersion characteristic of an optical communications link from which the optical communications signal is received. The method may operate blindly and adaptively to jointly perform chromatic dispersion estimation and compensation quickly and effectively. The method may provide a chromatic dispersion estimation which is more accurate than is achievable with the prior art and which operates more quickly since it operates without the need for look up tables or training sequences.

In an embodiment, step c. further comprises generating an inverted channel linear transfer function of the optical communications signal from the dispersion corrected samples and applying the inverted channel linear transfer function to the dispersion corrected samples, to form dispersion compensated samples. The method may therefore perform dispersion compensation on the samples to form dispersion compensated samples.

In an embodiment, step c. is implemented using a time domain equaliser comprising a two-dimensional fractionally spaced feed forward equaliser having a number of taps in the range 5 to 15. In an embodiment, the time domain equaliser comprises a two-dimensional fractionally spaced feed forward equaliser having 5 taps. A very low number of taps may therefore be used to achieve convergence of the estimated residual chromatic dispersion with the threshold value.

In an embodiment, each tap has a tap coefficient and the time domain equaliser is arranged to apply the minimum mean square error, MMSE, criterion to adapt the tap coefficients in order to converge its operation to a two-dimensional matched filter, as reported by G. Colavolpe et al, "Robust multilevel coherent optical systems with linear processing at the receiver," J. Lightwave Techno., vol. 27, no. 13, pages 2357-2369, 2009. In an embodiment, the value of chromatic dispersion used in the initial implementation of step b. is one of 0 ps/nm, a known minimum chromatic dispersion accumulated by the optical communications signal, and a known chromatic dispersion of a link of an optical communications network from which the optical communications signal is received. Setting the initial value to 0 ps/nm may enable the method to operate completely blind to the chromatic dispersion of the link from which the optical communications signal is received. This may enable the method to operate in a very general manner with minimal user input. If the chromatic dispersion accumulated by the optical communications signal during propagation is known to range between a known minimum and maximum value, the initial value may be set to the known minimum value. This may enable faster convergence than when operating completely blind. A known chromatic dispersion of the link from which the optical communications signal is received may be provided from the control plane of the communications network. This may also enable faster convergence than when operating completely blind.

In an embodiment, the method further comprises step d. of determining a bit error rate of the dispersion compensated samples. Step d. further comprises comparing the bit error rate to a first threshold bit error rate and, unless the bit error rate is less than the first threshold bit error rate, adding a preselected chromatic dispersion increment to the value of chromatic dispersion previously compensated for, to form an incremented value of chromatic dispersion. Steps b. to d. are repeated until the bit error rate is less than the first threshold bit error rate.

In an embodiment, the chromatic dispersion increment is selected in dependence on a bit rate and modulation format of the optical communications signal and on the number of taps of the time domain equaliser. In an embodiment, the chromatic dispersion increment is less than 1000 ps/nm.

In an embodiment, step f. additionally comprises comparing the bit error rate to a second threshold bit error rate. The estimated residual chromatic dispersion value is added to the value of chromatic dispersion previously compensated for, to form a subsequent value of chromatic dispersion, unless the bit error rate is less than the second threshold bit error rate and the estimated residual chromatic dispersion value is less than the threshold value.

When the bit error rate is less than the second threshold bit error rate and the estimated residual chromatic dispersion value is less than the threshold value the majority of the chromatic dispersion has been compensated for by the frequency domain equaliser. The time domain equaliser is required only to compensate for a minimum chromatic dispersion, defined by the threshold value. The time domain equaliser may therefore invert the channel linear transfer function with a very good approximation with a very low number of taps. This may improve the robustness of the method to sudden changes in chromatic dispersion.

In an embodiment, the threshold value is in the range 10 ps/nm to 50 ps/nm. In an embodiment, the threshold value is 10 ps/nm. The lower the threshold value, the greater is the amount of chromatic dispersion that is compensated for by the frequency domain equaliser but the higher is the number of iterations required. A threshold value of 10 ps/nm may provide both accuracy of the estimated residual chromatic dispersion and an acceptable number of iterations.

In an embodiment, first threshold bit error rate is 0.48. This may allow the time domain equaliser to converge and the optical performance monitoring apparatus to output a useful value of estimated residual chromatic dispersion.

In an embodiment, second threshold bit error rate is $1.0 \times 10^{-3}$.

In an embodiment, the method further comprises generating and transmitting an output signal comprising an indication of the estimated residual chromatic dispersion value.

In an embodiment, the optical communications signal comprises an optical communications traffic signal. In an embodiment, the optical communications signal comprises a portion of an optical communications traffic signal.

A third aspect of the invention provides optical monitoring apparatus comprising optical detection apparatus, analog to digital conversion apparatus and chromatic dispersion processing apparatus. The optical detection apparatus is arranged to receive an optical communications signal and to generate an electrical representation of the optical communications signal. The analog to digital conversion apparatus is arranged to generate samples of the electrical representation. The chromatic dispersion processing apparatus comprising an equalizer loop which comprises a frequency domain equaliser, a time domain equaliser, optical performance monitoring apparatus and a processor. The frequency domain equaliser is arranged to receive samples of an electrical representation of an optical communications signal having a chromatic dispersion. The frequency domain equaliser is arranged to apply chromatic dispersion compensation to the samples, to form dispersion corrected samples having a residual chromatic dispersion value. The time domain equaliser is arranged to receive the dispersion corrected samples and to generate a representation of a channel linear transfer function of the optical communications signal from the dispersion corrected samples. The time domain equaliser is arranged to generate and transmit a monitoring signal comprising the representation of the channel linear transfer function. The optical performance monitoring apparatus is arranged to receive the monitoring signal and to estimate the residual chromatic dispersion value from the representation of the channel linear transfer function. The processor is arranged to receive the estimated residual chromatic dispersion value and to compare the estimated residual chromatic dispersion value to a threshold value. The processor is arranged to generate and transmit to the frequency domain equaliser an estimation signal comprising the estimated residual chromatic dispersion value unless the estimated residual chromatic dispersion value is less than the threshold value.

The optical receiver may be used to compensate for chromatic dispersion and/or to estimate chromatic dispersion.

The equalizer loop arrangement of the frequency domain equaliser, time domain equaliser and optical performance monitoring apparatus may enable the chromatic dispersion processing apparatus to compensate for chromatic dispersion of an optical communications signal without any knowledge of the chromatic dispersion characteristic of an optical communications link from which the optical communications signal is received. The chromatic dispersion processing apparatus may exploit blind equalisation in the time domain equaliser and low computational complexity in the frequency domain equaliser to jointly compensate for chromatic dispersion and estimate chromatic dispersion quickly and effectively. Arranging the frequency domain equaliser, time domain equaliser and optical performance monitoring apparatus in an equaliser loop may enable the time domain equaliser to operate at an optimised load and to have greater margins for variations. The chromatic dispersion processing apparatus may provide a chromatic dispersion estimation which is more accurate than is achievable with the prior art and which operates more quickly since it operates without the need for look up tables or training sequences for the time domain equaliser.

In an embodiment, the equalizer loop is arranged to operate iteratively until the estimated residual chromatic dispersion value is less than the threshold value. The chromatic dispersion processing apparatus may therefore operate blindly and adaptively.

In an embodiment, the time domain equaliser is arranged to generate an inverted channel linear transfer function of the optical communications signal from the dispersion corrected samples and to apply the inverted channel linear transfer function to the dispersion corrected samples, to form dispersion compensated samples. The chromatic dispersion processing apparatus is therefore able to perform dispersion compensation on the samples, to form dispersion compensated samples.

In an embodiment, the time domain equaliser comprises a two-dimensional fractionally spaced feed forward equaliser having a number of taps in the range 5 to 15. The number of taps is fewer than the number of taps required for the time domain equaliser to fully compensate the chromatic dispersion of the optical communications signal. The chromatic dispersion processing apparatus is therefore based on a frequency domain equaliser, a low complexity time domain equaliser and optical performance monitoring apparatus arranged in an equaliser loop.

In an embodiment, the time domain equaliser comprises a two-dimensional fractionally spaced feed forward equaliser having 5 taps. A very low number of taps may therefore be used to achieve convergence of the estimated residual chromatic dispersion with the threshold value.

In an embodiment, each tap has a tap coefficient and the time domain equaliser is arranged to apply the minimum mean square error, MMSE, criterion to adapt the tap coefficients in order to converge its operation to a two-dimensional matched filter, as reported by G. Colavolpe et al, "Robust multilevel coherent optical systems with linear processing at the receiver," J. Lightwave Technol, vol. 27, no. 13, pages 2357-2369, 2009.

In an embodiment, the frequency domain equaliser is arranged to compensate the samples for an initial value of chromatic dispersion. The frequency domain equaliser is arranged, in response to receipt of a said estimation signal, to compensate the samples for a subsequent value of chromatic dispersion. The subsequent value is the sum of the initial value and of the respective estimated residual chromatic dispersion value of the said estimation signal and of each previously received estimation signal.

In an embodiment, the initial value is one of 0 ps/nm, a known minimum chromatic dispersion accumulated by the optical communications signal, and a known chromatic dispersion of a link of an optical communications network from which the optical communications signal is received. Setting the initial value to 0 ps/nm may enable the optical receiver to operate completely blind to the chromatic dispersion of the link from which the optical communications signal is received. This may enable the optical receiver to operate in a very general manner with minimal user input. If the chromatic dispersion accumulated by the optical communications signal during propagation is known to range between a known minimum and maximum value, the initial value may be set to the known minimum value. This may enable faster convergence of the time domain equaliser than when operating completely blind. A known chromatic dispersion of the link from which the optical communications signal is received may be provided from the control plane of the communications network. This may also enable faster convergence of the time domain equaliser then when operating completely blind.

In an embodiment, the chromatic dispersion processing apparatus further comprises bit error rate monitoring apparatus arranged to determine a bit error rate of the dispersion compensated samples. The processor is arranged to receive the bit error rate and to compare the bit error rate to a first threshold bit error rate. The processor is arranged iteratively to cause a preselected chromatic dispersion increment to be added to the value of chromatic dispersion previously compensated for unless the bit error rate is less than the first threshold bit error rate.

In an embodiment, the chromatic dispersion increment is selected in dependence on a bit rate and modulation format of the optical communications signal and on the number of taps of the time domain equaliser. In an embodiment, the chromatic dispersion increment is less than 1000 ps/nm.

In an embodiment, the bit error rate monitoring apparatus comprises a forward error correction device.

In an embodiment, the processor is arranged, in response to the bit error rate being less than the first threshold bit error rate, to compare the bit error rate to a second threshold bit error rate. The processor is arranged to generate and transmit the estimation signal comprising the estimated residual chromatic dispersion value unless the bit error rate is less than the second threshold bit error rate and the estimated residual chromatic dispersion value is less than the threshold value.

When the bit error rate is less than the second threshold bit error rate and the estimated residual chromatic dispersion value is less than the threshold value the majority of the chromatic dispersion has been compensated for by the frequency domain equaliser. The time domain equaliser is required only to compensate for a minimum chromatic dispersion, defined by the threshold value. The time domain equaliser may therefore invert the channel linear transfer function with a very good approximation with a very low number of taps. This may improve the robustness of the optical receiver to sudden changes in chromatic dispersion.

In an embodiment, the threshold value is in the range 10 ps/nm to 50 ps/nm. In an embodiment, the threshold value is 10 ps/nm. The lower the threshold value, the greater is the amount of chromatic dispersion that is compensated for by the frequency domain equaliser but the higher is the number of iterations required. A threshold value of 10 ps/nm may provide both accuracy of the estimated residual chromatic dispersion and an acceptable number of iterations.

In an embodiment, first threshold bit error rate is 0.48. This may allow the time domain equaliser to converge and the optical performance monitoring apparatus to output a useful value of estimated residual chromatic dispersion.

In an embodiment, second threshold bit error rate is $1.0 \times 10^{-3}$.

In an embodiment, the optical performance monitoring apparatus is arranged to generate and transmit an output signal comprising an indication of the estimated residual chromatic dispersion value.

In an embodiment, the optical communications signal comprises a portion of an optical communications traffic signal.

In an embodiment, the optical detection apparatus comprises a coherent optical receiver comprising a wavelength tunable local oscillator. The optical monitoring apparatus may therefore be used to estimate the chromatic dispersion of optical communications signals of different wavelengths.

A fourth aspect of the invention provides an optical receiver comprising optical detection apparatus, analog to digital conversion apparatus and digital signal processing apparatus. The optical detection apparatus is arranged to receive an optical communications signal and to generate an electrical representation of the optical communications signal. The analog to digital conversion apparatus is arranged to generate samples of the electrical representation. The digital signal processing apparatus comprises chromatic dispersion processing apparatus. The chromatic dispersion processing apparatus comprising an equalizer loop which comprises a frequency domain equaliser, a time domain equaliser, optical performance monitoring apparatus and a processor. The frequency domain equaliser is arranged to receive samples of an electrical representation of an optical communications signal having a chromatic dispersion. The frequency domain equaliser is arranged to apply chromatic dispersion compensation to the samples, to form dispersion corrected samples having a residual chromatic dispersion value. The time domain equaliser is arranged to receive the dispersion corrected samples and to generate a representation of a channel linear transfer function of the optical communications signal from the dispersion corrected samples. The time domain equaliser is arranged to generate and transmit a monitoring signal comprising the representation of the channel linear transfer function. The optical performance monitoring apparatus is arranged to receive the monitoring signal and to estimate the residual chromatic dispersion value from the representation of the channel linear transfer function. The processor is arranged to receive the estimated residual chromatic dispersion value and to compare the estimated residual chromatic dispersion value to a threshold value. The processor is arranged to generate and transmit to the frequency domain equaliser an estimation signal comprising the estimated residual chromatic dispersion value unless the estimated residual chromatic dispersion value is less than the threshold value.

The optical receiver may be used to compensate for chromatic dispersion and/or to estimate chromatic dispersion.

The equalizer loop arrangement of the frequency domain equaliser, time domain equaliser and optical performance monitoring apparatus may enable the chromatic dispersion processing apparatus to compensate for chromatic dispersion of an optical communications signal without any knowledge of the chromatic dispersion characteristic of an optical communications link from which the optical communications signal is received. The chromatic dispersion processing apparatus may exploit blind equalisation in the time domain equaliser and low computational complexity in the frequency domain equaliser to jointly compensate for chromatic dispersion and estimate chromatic dispersion quickly and effectively. Arranging the frequency domain equaliser, time domain equaliser and optical performance monitoring apparatus in an equaliser loop may enable the time domain equaliser to operate at an optimised load and to have greater margins for variations. The chromatic dispersion processing apparatus may provide a chromatic dispersion estimation which is more accurate than is achievable with the prior art and which operates more quickly since it operates without the need for look up tables or training sequences for the time domain equaliser.

In an embodiment, the equalizer loop is arranged to operate iteratively until the estimated residual chromatic dispersion value is less than the threshold value. The chromatic dispersion processing apparatus may therefore operate blindly and adaptively.

In an embodiment, the time domain equaliser is arranged to generate an inverted channel linear transfer function of the optical communications signal from the dispersion corrected samples and to apply the inverted channel linear transfer function to the dispersion corrected samples, to form dispersion compensated samples. The chromatic dispersion processing apparatus is therefore able to perform dispersion compensation on the samples, to form dispersion compensated samples.

In an embodiment, the time domain equaliser comprises a two-dimensional fractionally spaced feed forward equaliser having a number of taps in the range 5 to 15. The number of taps is fewer than the number of taps required for the time domain equaliser to fully compensate the chromatic dispersion of the optical communications signal. The chromatic dispersion processing apparatus is therefore based on a frequency domain equaliser, a low complexity time domain equaliser and optical performance monitoring apparatus arranged in an equaliser loop.

In an embodiment, the time domain equaliser comprises a two-dimensional fractionally spaced feed forward equaliser having 5 taps. A very low number of taps may therefore be used to achieve convergence of the estimated residual chromatic dispersion with the threshold value.

In an embodiment, each tap has a tap coefficient and the time domain equaliser is arranged to apply the minimum mean square error, MMSE, criterion to adapt the tap coefficients in order to converge its operation to a two-dimensional matched filter, as reported by G. Colavolpe et al, "Robust multilevel coherent optical systems with linear processing at the receiver," J. Lightwave Technol, vol. 27, no. 13, pages 2357-2369, 2009.

In an embodiment, the frequency domain equaliser is arranged to compensate the samples for an initial value of chromatic dispersion. The frequency domain equaliser is arranged, in response to receipt of a said estimation signal, to compensate the samples for a subsequent value of chromatic dispersion. The subsequent value is the sum of the initial value and of the respective estimated residual chromatic dispersion value of the said estimation signal and of each previously received estimation signal.

In an embodiment, the initial value is one of 0 ps/nm, a known minimum chromatic dispersion accumulated by the optical communications signal, and a known chromatic dispersion of a link of an optical communications network from which the optical communications signal is received. Setting the initial value to 0 ps/nm may enable the optical receiver to operate completely blind to the chromatic dispersion of the link from which the optical communications signal is received. This may enable the optical receiver to operate in a very general manner with minimal user input. If the chromatic dispersion accumulated by the optical communications signal during propagation is known to range between a known minimum and maximum value, the initial value may be set to the known minimum value. This may enable faster convergence of the time domain equaliser than when operating completely blind. A known chromatic dispersion of the link from which the optical communications signal is received may be provided from the control plane of the communications network. This may also enable faster convergence of the time domain equaliser then when operating completely blind.

In an embodiment, the chromatic dispersion processing apparatus further comprises bit error rate monitoring apparatus arranged to determine a bit error rate of the dispersion compensated samples. The processor is arranged to receive the bit error rate and to compare the bit error rate to a first threshold bit error rate. The processor is arranged iteratively to cause a preselected chromatic dispersion increment to be added to the value of chromatic dispersion previously compensated for unless the bit error rate is less than the first threshold bit error rate.

In an embodiment, the chromatic dispersion increment is selected in dependence on a bit rate and modulation format of the optical communications signal and on the number of taps of the time domain equaliser. In an embodiment, the chromatic dispersion increment is less than 1000 ps/nm.

In an embodiment, the bit error rate monitoring apparatus comprises a forward error correction device.

In an embodiment, the processor is arranged, in response to the bit error rate being less than the first threshold bit error rate, to compare the bit error rate to a second threshold bit error rate. The processor is arranged to generate and transmit the estimation signal comprising the estimated residual chromatic dispersion value unless the bit error rate is less than the second threshold bit error rate and the estimated residual chromatic dispersion value is less than the threshold value.

When the bit error rate is less than the second threshold bit error rate and the estimated residual chromatic dispersion value is less than the threshold value the majority of the chromatic dispersion has been compensated for by the frequency domain equaliser. The time domain equaliser is required only to compensate for a minimum chromatic dispersion, defined by the threshold value. The time domain equaliser may therefore invert the channel linear transfer function with a very good approximation with a very low number of taps. This may improve the robustness of the optical receiver to sudden changes in chromatic dispersion.

In an embodiment, the threshold value is in the range 10 ps/nm to 50 ps/nm. In an embodiment, the threshold value is 10 ps/nm. The lower the threshold value, the greater is the amount of chromatic dispersion that is compensated for by the frequency domain equaliser but the higher is the number of iterations required. A threshold value of 10 ps/nm may provide both accuracy of the estimated residual chromatic dispersion and an acceptable number of iterations.

In an embodiment, first threshold bit error rate is 0.48. This may allow the time domain equaliser to converge and the optical performance monitoring apparatus to output a useful value of estimated residual chromatic dispersion.

In an embodiment, second threshold bit error rate is $1.0 \times 10^{-3}$.

In an embodiment, the optical performance monitoring apparatus is arranged to generate and transmit an output signal comprising an indication of the estimated residual chromatic dispersion value.

In an embodiment, the optical receiver is a digital coherent receiver.

In an embodiment, the optical communications signal comprises an optical communications traffic signal. In an embodiment, the optical communications signal comprises a portion of an optical communications traffic signal.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of compensating for chromatic dispersion of an optical communications signal.

In an embodiment, the data carrier is a non-transitory data carrier.

Embodiments of the invention will now be described, by way of example only, with reference to the accompanying drawings.

DETAILED DESCRIPTION

Figure 1:
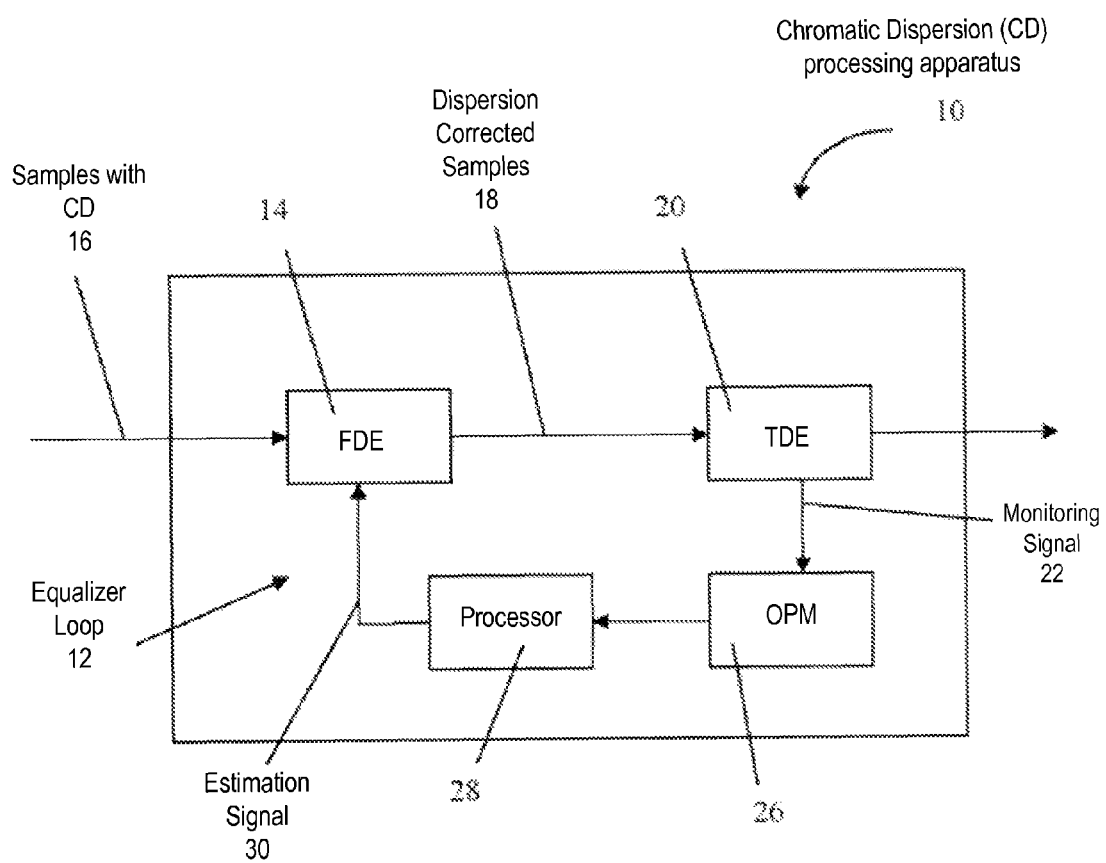
FIG. 1 is a schematic representation of chromatic dispersion processing apparatus according to a first embodiment of the invention.

A first embodiment of the invention provides chromatic dispersion (CD) processing apparatus 10 as shown in FIG. 1. The CD processing apparatus 10 comprises an equalizer loop 12 which comprises a frequency domain equalizer (FDE) 14, a time domain equalizer (TDE) 20, optical performance monitoring (OPM) apparatus 26 and a processor 28. The FDE 14, TDE 20 and OPM 26 are arranged in a loop configuration.

The FDE 14 is arranged to receive samples 16 of an electrical representation of an optical communications signal. The optical communications signal has CD, which it will typically have acquired as a result of propagation across a link of a communications network (not shown). The FDE 14 is arranged to apply CD compensation to the samples, to form dispersion corrected samples 18. The dispersion corrected samples have a residual CD value.

The TDE 20 is arranged to receive the dispersion corrected samples from the FDE 14. The TDE is arranged to generate a representation of the channel linear transfer function of the optical communications signal from the dispersion corrected samples and to generate and transmit a monitoring signal 22 comprising the representation of the channel linear transfer function. The OPM apparatus 26 is arranged to receive the monitoring signal 22 and to estimate the residual CD value of the dispersion corrected samples 18 from the representation of the channel linear transfer function. The processor 28 is arranged to receive the estimated residual value and to compare the estimated residual value to a threshold CD value. The processor is arranged to generate and transmit an estimation signal 30 to the FDE 14 unless the estimated residual value is less than the threshold value. The estimation signal 30 comprises the estimated residual value.

The equalizer loop 12 is arranged to operate iteratively until the estimated CD residual value is less than the threshold value.

Figure 2:
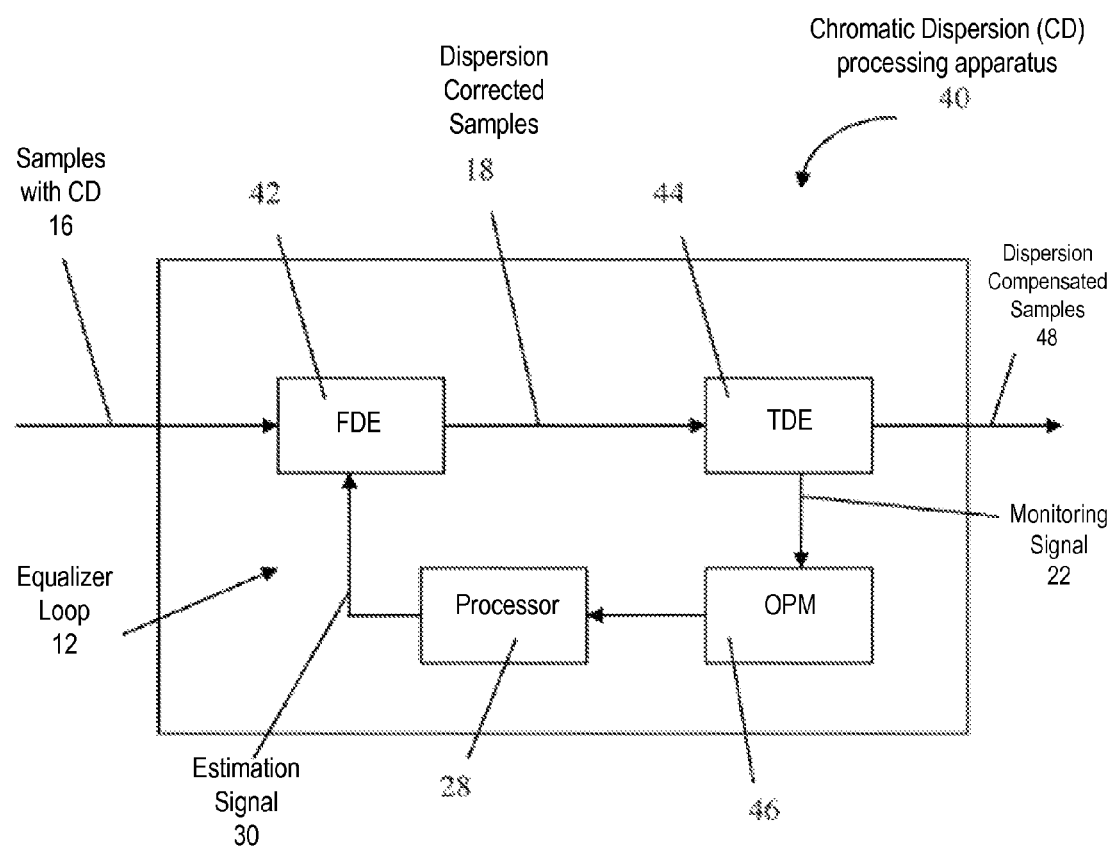
FIG. 2 is a schematic representation of chromatic dispersion processing apparatus according to a second embodiment of the invention.

FIG. 2 shows CD processing apparatus 40 according to a second embodiment of the invention. The CD processing apparatus 40 of this embodiment is similar to the apparatus 10 shown in FIG. 1 with the following modifications. The same reference numbers are retained for corresponding features.

In this embodiment, the TDE comprises a 2-dimensional fractionally spaced feed forward equalizer (FFE) 44 having a number of taps in the range 5-15.

The TDE 44 consists of four complex valued finite impulse response (FIR) filters, arranged in a butterfly structure and optimized adopting the minimum mean square error (MMSE) criterion for adaptation of the tap coefficients. A TDE of sufficient length is able to perfectly compensate for CD and PMD, since it implements a matched filter, as reported by G. Colavolpe et al (ibid).

The TDE 44 is arranged to generate an inverted channel linear transfer function of the optical communications signal from the dispersion corrected samples. The TDE 44 is arranged to apply the inverted channel linear transfer function to the dispersion corrected samples, to form dispersion compensated samples 48.

The CD processing apparatus 40 makes use of the fact that the TDE frequency response $H_{TDE}(f)$ is equal to the inverse channel frequency response $H_{ch}(f)$:

$$H_{TDE}(f) = H_{ch}^{-1}(f) = \begin{pmatrix} H_{11}(f) & H_{12}(f) \\ H_{21}(f) & H_{22}(f) \end{pmatrix}$$

where $H_{ij}$ are the frequency responses of each FIR filter and are calculated by means of Fast Fourier Transform (FFT) of the FIR filter taps. In the weekly non-linear regime, CD and PMD contribute together to the total channel impulse response:

$$H_{TDE}(f) = D(f) \cdot U(f)$$

where the CD contribution $D(f)$ is a polarization independent linear function, that results in a quadratic phase, while PMD is a frequency dependent effect and is represented by the unitary matrix $U(f)$. Starting from $H_{TDE}(f)$, the residual CD may be estimated by applying a second derivative of the quadratic phase of the determinant of $H(f)$.

$$D(f) = \exp(-j\varphi) = \det(H_{TDE}) \quad \text{Equation (1)}$$

$$\varphi = \frac{\beta_2}{2} L \omega^2 \quad \text{Equation (2)}$$

$$CD = -\frac{2\pi c}{\lambda^2} \frac{\partial^2 \varphi}{\partial \omega^2} \text{ [ps/nm]} \quad \text{Equation (3)}$$

The representation of the channel linear transfer function generated by the TDE 44 is derived from the frequency responses of the FIR filters, $H_{ij}(f)$. The OPM 46 is arranged to estimate the residual CD value from the frequency responses of the FIR filters, by applying equations (1) to (3).

The FDE 42 is arranged to compensate the samples 16 for an initial value of CD. The FDE 42 is arranged, in response to receipt of an estimation signal 30, to compensate the samples for a subsequent value of CD. The subsequent value of CD is the sum of the initial CD value and of the estimated residual value provided by the estimation signal plus each previously received estimated residual value. The residual CD calculated by the OPM apparatus 46 is used in a feedback loop to set the CD which is compensated for by the FDE 42 in a loop configuration. In this embodiment the FDE 42 is arranged to compensate for an initial value of CD which is set to 0 ps/nm. This is the most general and blind configuration of the FDE 42 since it requires no knowledge of the CD accumulated by the optical communications signal which is to be compensated for.

In use, at the first iteration, the CD value compensated by the FDE 42 is set to 0 ps/nm. The OPM apparatus 46 thus provides a very rough estimation of the residual CD because the linear transfer function reconstruction performed by the TDE 44 will be strongly inaccurate due to the low number of taps. This estimated CD value is then provided to the FDE which implement a partial CD compensation during the second iteration. Since a portion of CD is compensated by the FDE during the second iteration, the linear transfer function reconstruction performed by the TDE 44 is more precise and the OPM apparatus performs a more accurate estimation of the residual CD with respect to the first iteration. The greater the amount of CD compensated by the FDE, the more precise is the residual CD estimated by the OPM apparatus 46 because the low complexity TDE will perform the inversion of channel linear transfer function with more accuracy. This process is iterated until the estimated residual CD determined by the OPM apparatus is below a preselected threshold value. At this point the majority of the CD is compensated by the FDE, and the TDE is able to invert the channel linear transfer function with a very good approximation, even with a low number of taps. Furthermore the TDE 44 is responsible for a minimal CD compensation, thereby increasing the margin against sudden changes in CD.

Alternatively, if the CD accumulated by the optical communications signal during propagation across a link of an optical communications network can range between a known minimum and maximum value, the FDE 42 can be initialized to apply an initial value of CD equivalent to the known minimum CD. If the communications network control plane has a rough estimation of the link CD, the FDE 42 can be initialized to apply initial CD of this known link CD estimation.

Figure 3:
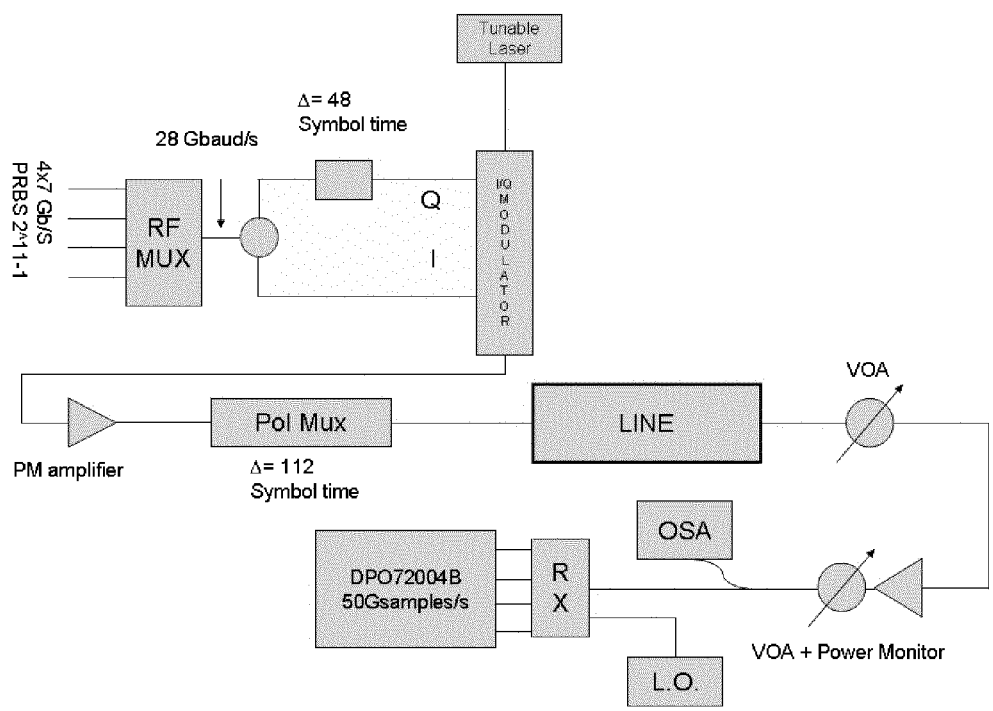
FIG. 3 is a schematic representation of experimental apparatus used to assess the chromatic dispersion processing apparatus of FIG. 2.

The performance of the CD processing apparatus 40 of FIG. 2 was assessed using a 112 Gbit/s PM-QPSK coherent test bed as shown in FIG. 3. Four data streams at 7 Gb/s were multiplexed with an electrical multiplexer (RF MUX) in order to obtain a 28 Gb/s pseudo random bit sequence of length $2^{11}-1$. The 28 Gb/s data stream was power divided and one of the two branches was delayed by 48 symbol times. The two electrical signals were sent to the I and Q input of an integrated I/Q LiNbO$_3$ double nested modulator. The 56 Gb/s QPSK signal was then sent to a polarization multiplexer (Pol. Mux.) where it was divided in two components. One component was delayed by 112 symbol times, 90° rotated in polarization and then coupled together to obtain a 112 Gb/s PM-QPSK signal.

An optical communications signal to be tested was propagated along 80 km of standard G652 fibre, to acquire CD. At the receiver, the optical communications signal and a local oscillator generated reference signal were sent to a polarization diversity 90° hybrid, and received by four balanced photodiodes to generate an electrical representation of the optical communications signal consisting of four electrical signals. The four electrical signals were sampled by a 50 GSample/s real time oscilloscope, and acquired via a PC. The collected samples were processed offline by the FDE 42 and TDE 44 and the tap outputs used by the OPM apparatus 46 to estimate the residual CD. The test was performed using 11 and 5 taps in the TDE 44. The residual CD value estimated by the OPM apparatus 46 was then provided to the FDE 42 and then the process was iterated until the residual CD value estimated by the OPM apparatus 46 was below a threshold of 10 ps/nm.

Although the CD processing apparatus 40 of this embodiment is described with respect to performing both CD compensation and CD estimation in order to output dispersion compensated samples, it will be appreciated by the person skilled in the art that the apparatus 40 may be arranged to operate solely as a CD estimation apparatus. If the TDE 44 is arranged only to generate the representation of the channel linear transfer function of the optical communications signal from the dispersion corrected samples, and to generate and transmit the monitoring signal 22, the OPM 46 may be arranged to output the CD estimation, to thereby arrange the CD processing apparatus 40 solely to operate as a CD estimation apparatus.

Figure 4:
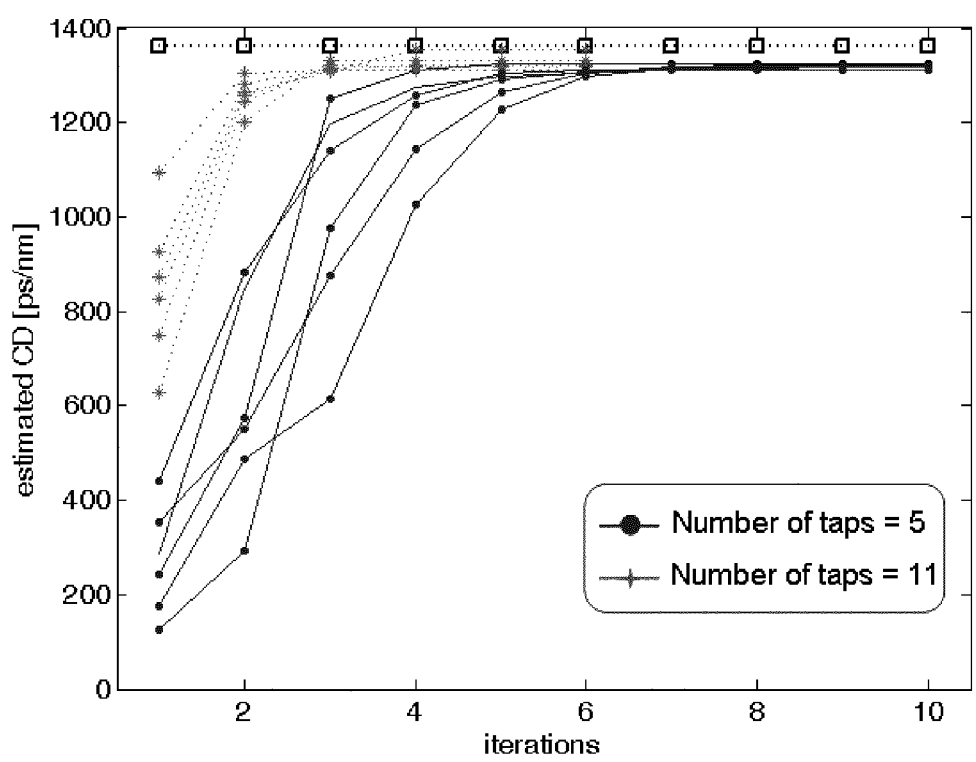
FIG. 4 shows estimated chromatic dispersion (CD) obtained by optical performance monitoring apparatus as a function of the number of iterations for a time delay equaliser having 11 taps (dotted lines) and having 5 taps (solid lines)

FIG. 4 shows the OPM estimated residual CD value as a function of the number of iterations for 6 subsequent acquisitions of samples. It can be seen that 11 taps are sufficient to reach the threshold in 3 iterations for all sets of samples. Convergence with the threshold was reached within 6 iterations using a TDE with 5 taps. The maximum CD estimation error obtained was 50 ps/nm, which correspond to 3.7% of the total CD.

As a comparison, CD compensation performed solely with a TDE was investigated using a time domain two-dimensional (2-D) fractionally spaced feed forward equalizer (FFE), as reported by G. Colavolpe et al (ibid). The performance of the OPM apparatus 46 was tested by numerical simulations, considering a known residual CD value accumulated during propagation of an optical communications signal having a 100 Gb/s polarization multiplexed quaternary phase shift keying (PM-QPSK) modulation format with a standard differential encoding rule. Gray mapping was employed to map bits onto M-ary symbols. A non-return-to-zero signal filtered by an electrical baseband Gaussian filter was adopted at the transmitter. At the receiver, an optical fourth-order Gaussian filter was used. After an initial training period that allowed the TDE to reach convergence, the TDE taps were used with Equations (1) to (3) to obtain a CD estimation.

A TDE with 15 taps was found to be sufficient to perfectly equalize the optical communications signal for any amount of CD up to 1250 ps/nm, for an error free condition. The estimated residual CD calculated by the OPM apparatus was found to have an error of less than 4% for a TDE with 23 taps. A TDE with 15 taps gave an error of about 5% at 1000 ps/nm and 18% at 1250 ps/nm. Therefore, in order to obtain a good CD estimation using the OPM apparatus, a TDE with a much higher number of taps (23) must be used than is needed to invert the channel (15).

Figure 5:
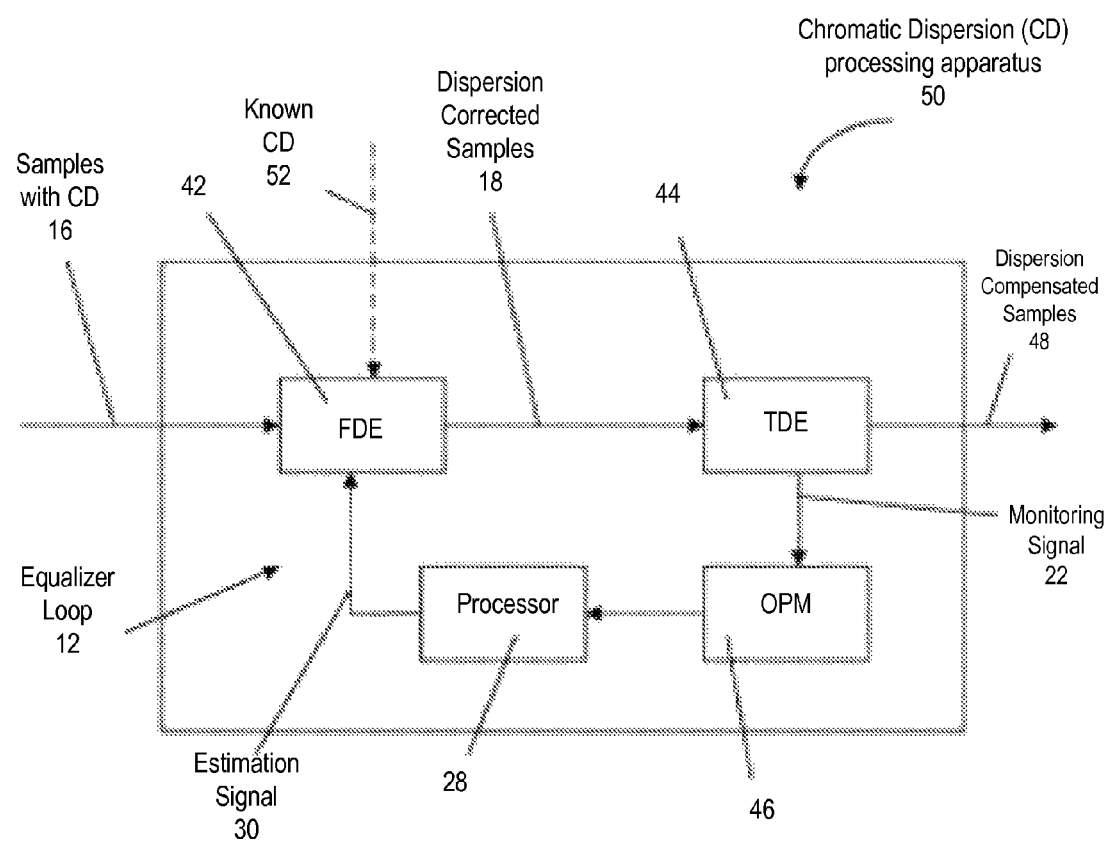
FIG. 5 is a schematic representation of chromatic dispersion processing apparatus according to a third embodiment of the invention.

A third embodiment of the invention provides CD processing apparatus 50 as shown in FIG. 5. The CD processing apparatus 50 of this embodiment is similar to the CD processing apparatus 40 shown in FIG. 2, with the following modifications. In this embodiment the FDE 42 is arranged to compensate the samples 16 for an initial value of CD which is either a known minimum CD accumulated by the optical communications signal on transmission across a link of an optical communications network and a known CD 52 of a link of an optical communications network from which the optical communications signal is received.

Figure 6:
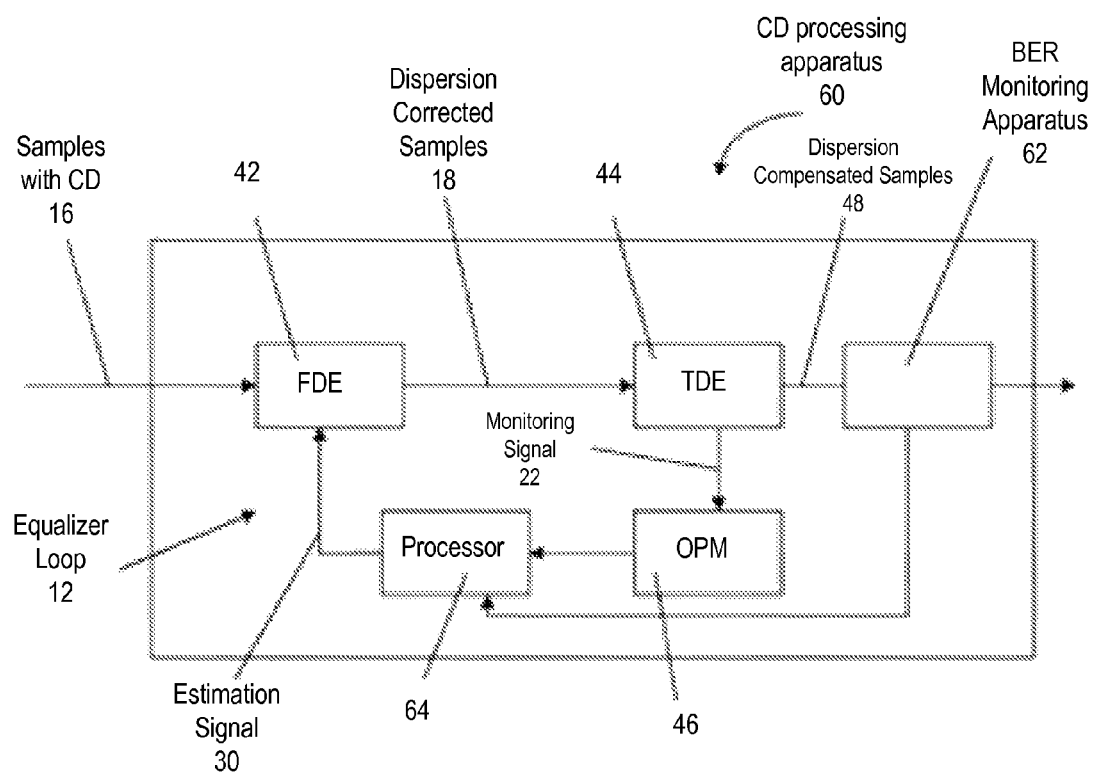
FIG. 6 is a schematic representation of chromatic dispersion processing apparatus according to a fourth embodiment of the invention.

A fourth embodiment of the invention provides CD processing apparatus 60 as shown in FIG. 6. The apparatus 60 of this embodiment is similar to the CD processing apparatus of FIG. 2 with the following modifications. The same reference numbers are retained for corresponding features.

In this embodiment, the CD processing apparatus 60 further comprises bit error rate (BER) monitoring apparatus 62 which is arranged to determine a BER of the dispersion compensated samples 48. In this example the BER monitoring apparatus comprises a forward error correction (FEC) device.

The processor 64 of this embodiment is arranged to receive the BER and to compare the BER to a first threshold BER. The processor 64 is arranged iteratively to cause a pre-selected CD increment to be added to the value of CD previously compensated for by the FDE 42 unless the BER is less than the first threshold BER. In response to the BER being less than the first threshold BER, the processor 64 is arranged to compare the BER to a second threshold BER. The processor 64 is arranged to generate and transmit the estimation signal 30 comprising the estimated residual CD value unless the BER is less than the second threshold BER and the estimated residual CD value is less than the threshold value.

In the case of a longer link, with higher uncompensated CD, the TDE 44 cannot converge. The OPM estimated residual CD value is therefore not significant and the equaliser loop of FIG. 2 cannot be applied. The CD processing apparatus 60 of this embodiment enables an advanced loop strategy to be adopted in order to maintain the use of a TDE having a low number of taps.

Following selection of the initial value of CD to be compensated for by the FDE 42, the FDE 42, TDE 44 and OPM apparatus 46 are operated as described above. The BER value given by the FEC device 62 is evaluated. If the BER is above a first threshold BER, this means that the TDE 44 cannot converge and the residual CD estimated by the OPM apparatus 46 is not a significant value. So preselected increment of CD is added to the CD previously compensated for (that is the initial value of CD following the first iteration) and the FDE is initialized to this new value of CD. The process is iterated with each iteration causing the CD increment to be added to the CD value given to the FDE.

This loop is repeated until the BER is less than the first BER threshold. Once this condition is met, a second check on the BER and on the estimated residual CD value determined by the OPM apparatus is performed. If the estimated residual CD is above its threshold value or the BER is above a second BER threshold value, the estimated residual CD determined by the OPM is added algebraically to the value given to the FDE. This loop is iterated until both the conditions are met.

When both the BER and estimated residual CD are below their respective thresholds, the iteration stops. At this point the majority of the CD is compensated for by the FDE, and the TDE is only required to compensate for a minimum CD quantity defined by the threshold value of the residual CD. The total compensated CD is the sum of the initial CD value given to the FDE plus the CD amount added during each iteration.

The CD increment value depends on the bit-rate, modulation format and number of taps in the TDE. In the case of a 108 Gbit/s PM-QPSK optical communications signal and a TDE with 5 taps, the CD increment must be below 1000 ps/nm. The first BER threshold is 0.48, which is the maximum BER value at which a receiver receiving the optical communications signal can see the constellation points of the signal. The first BER threshold is used to decide whether the estimated residual CD determined by the OPM. The second BER threshold is $1.0 \cdot 10^{-3}$, which is the FEC limit. The second BER threshold is a stop condition for the iterations.

The smaller the CD threshold value, the greater is the amount of CD compensated for by the FDE, but more iterations are required. In this embodiment, the CD threshold is 10 ps/nm, which balances accuracy of the estimation of residual CD and the number of iterations required. For a 108 Gbit/s PM-QPSK signal and a TDE with 5 taps, 5-10 iterations are required for the TDE to converge on the CD threshold value of 10 ps/nm.

Figure 7:
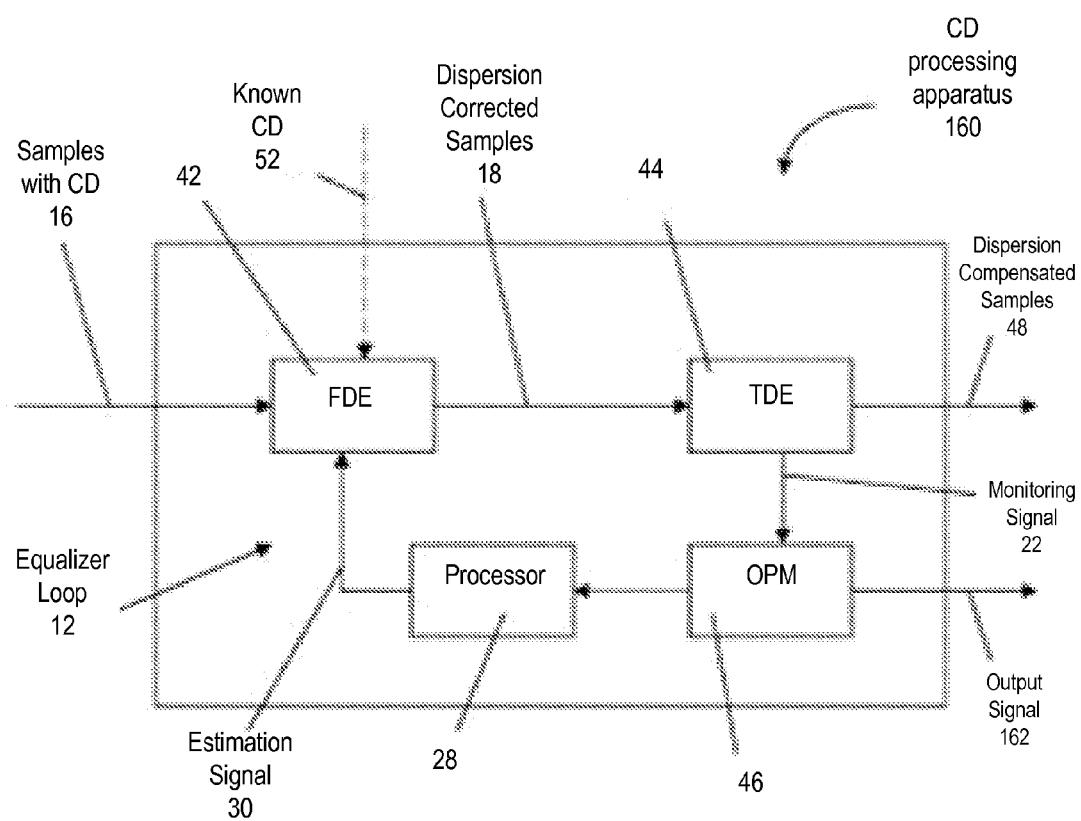
FIG. 7 is a schematic representation of chromatic dispersion processing apparatus according to a fifth embodiment of the invention.

A fifth embodiment of the invention provides CD processing apparatus 160 as shown in FIG. 7. The apparatus 160 of this embodiment is similar to the CD processing apparatus of FIG. 2 with the following modifications. The same reference numbers are retained for corresponding features.

In this embodiment, the OPM 46 is arranged to generated and transmit an output signal 162 comprising an indication of the estimated residual chromatic dispersion value. The apparatus 160 of this embodiment is therefore able to perform chromatic dispersion processing to output both dispersion compensated samples 48 and an estimation of the residual CD.

Figure 8:
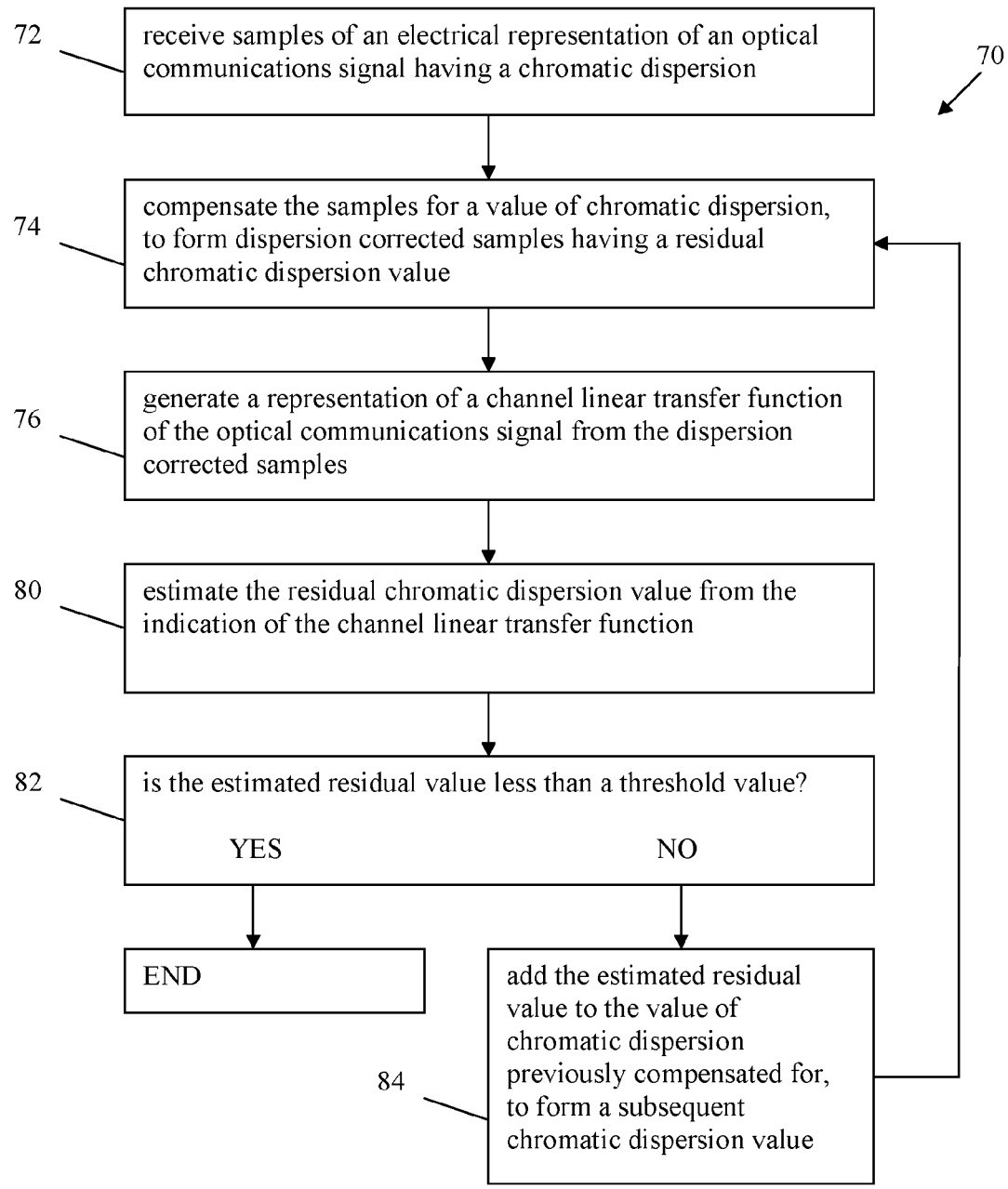
FIG. 8 shows the steps of a method according to a sixth embodiment of the invention of processing chromatic dispersion of an optical communications signal.

FIG. 8 shows the steps of a method 70 according to a sixth embodiment of the invention of processing chromatic dispersion of an optical communications signal.

The method comprises:
a. receiving samples of an electrical representation of an optical communications signal having a chromatic dispersion (72);
b. compensating the samples for a value of chromatic dispersion, to form dispersion corrected samples having a residual chromatic dispersion value (74);
c. generating a representation of a channel linear transfer function of the optical communications signal from the dispersion corrected samples (76);
e. estimating the residual chromatic dispersion value from the representation of the channel linear transfer function (80); and
f. comparing the estimated residual value to a threshold value (82) and unless it is less than the threshold value adding the estimated residual value to the value of chromatic dispersion previously compensated for, to form a subsequent value of chromatic dispersion (84); and
g. repeating steps b. to f. for respective subsequent values of chromatic dispersion until the estimated residual value is less than the threshold value.

Figure 9:
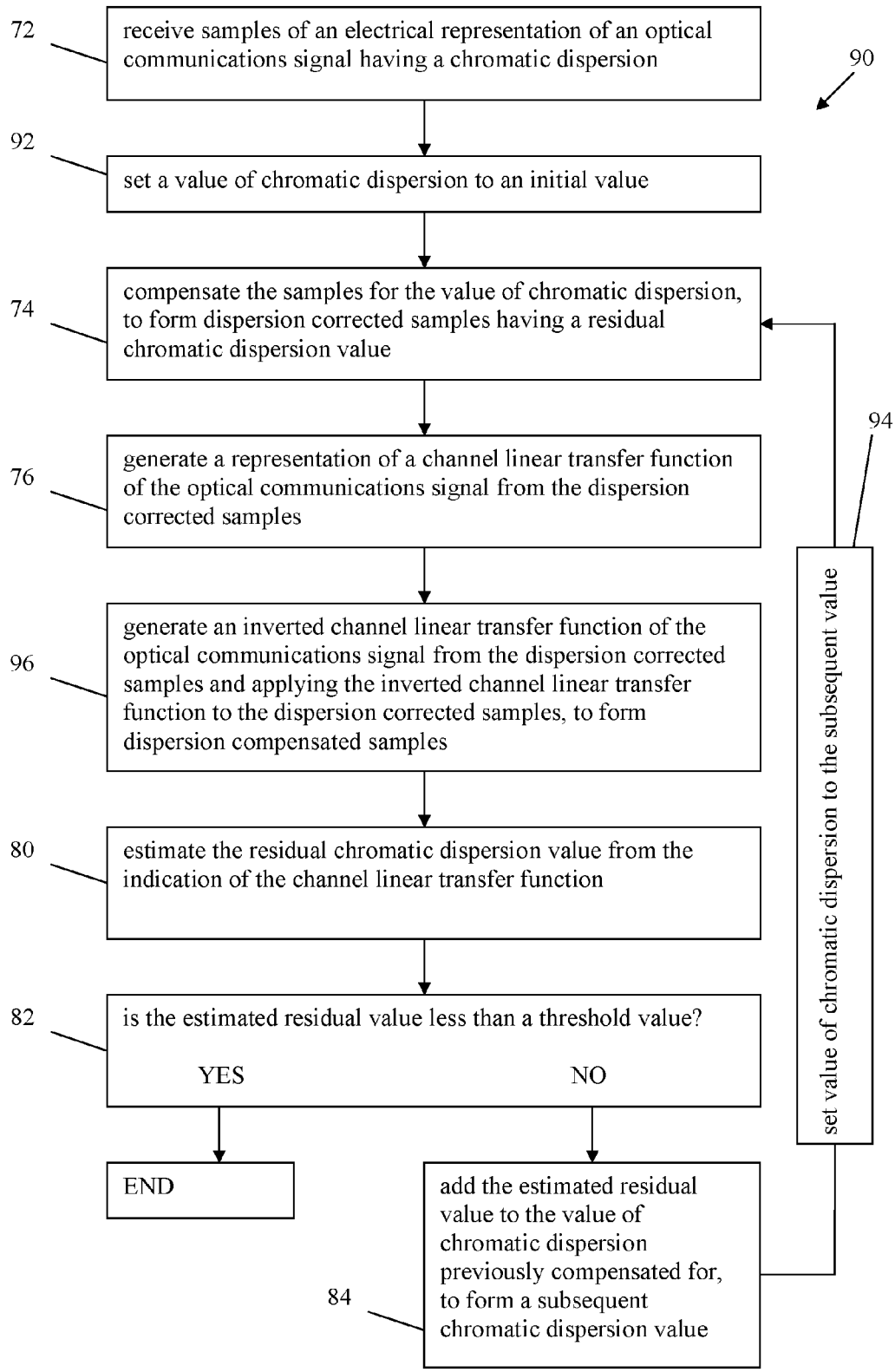
FIG. 9 shows the steps of a method according to a seventh embodiment of the invention of processing chromatic dispersion of an optical communications signal.

FIG. 9 shows the steps of a method 90 according to a seventh embodiment of the invention of processing chromatic dispersion of an optical communications signal. The method 90 of this embodiment is similar to the method 70 of FIG. 7, with the following modifications. The same reference numbers are retained for corresponding features.

In this embodiment, step c. additionally comprises generating an inverted channel linear transfer function of the optical communications signal from the dispersion corrected samples and applying the inverted channel linear transfer function to the dispersion corrected samples, to form dispersion compensated samples 96.

A TDE comprising a two-dimensional fractionally spaced FFE having a number of taps in the range 5 to 15 is used in step c. to generate the representation of a channel linear transfer function of the optical communications signal from the dispersion corrected samples 76. The TDE is also used in step c. to generate the inverted channel linear transfer function of the optical communications signal from the dispersion corrected samples and applying the inverted channel linear transfer function to the dispersion corrected samples, to form dispersion compensated samples 96.

The value of CD which is used in the initial implementation of step b. is set to an initial value 92. In this example, it is set to 0 ps/nm. If during the first iteration of steps b. to f. the estimated residual value is not less than the threshold value 82, the estimated residual CD value is added to the initial CD value to form a subsequent value of CD 84. The CD value to be used in the subsequent iteration of steps b. to f. is set to this subsequent value of CD 94. If during second and subsequent iterations of steps b. to f. the estimated residual value is not less than the threshold value 82, the estimated residual CD value is added to the value of CD previously compensated for (i.e. the previously set value of CD 94) to form a further subsequent value of CD 84 and the CD value to be used in the subsequent iteration of steps b. to f. is set to this subsequent value of CD 94.

It will be appreciated by the person skilled in the art that while this embodiment is described with respect to compensating for chromatic dispersion, if step c. comprises only generating a representation of a channel linear transfer function of the optical communications signal from the dispersion corrected samples, the method may be used to perform CD estimation without delivering dispersion compensated samples. It may be desirable to use the method 90 in this way in order to perform CD estimation off-line.

Figure 10:
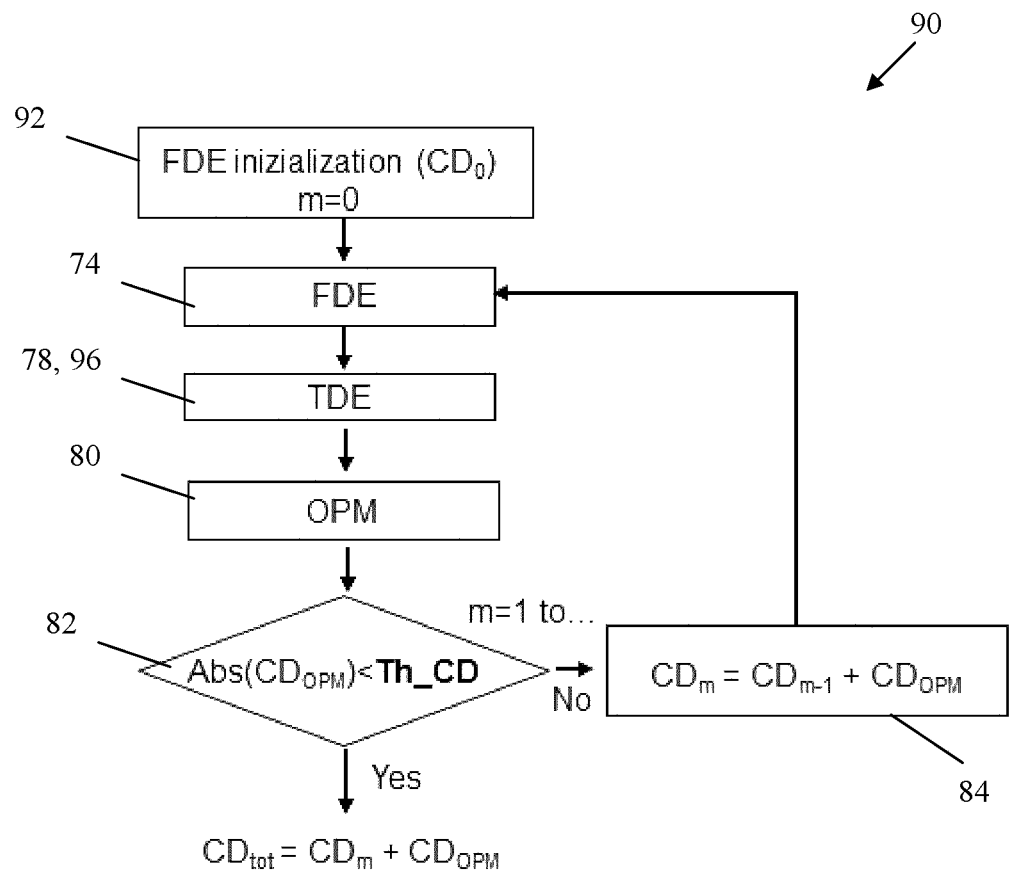
FIG. 10 is an alternative representation of the steps of the method shown in FIG. 9.

FIG. 10 is an alternative representation of the method 90 of FIG. 9.

Figure 11:
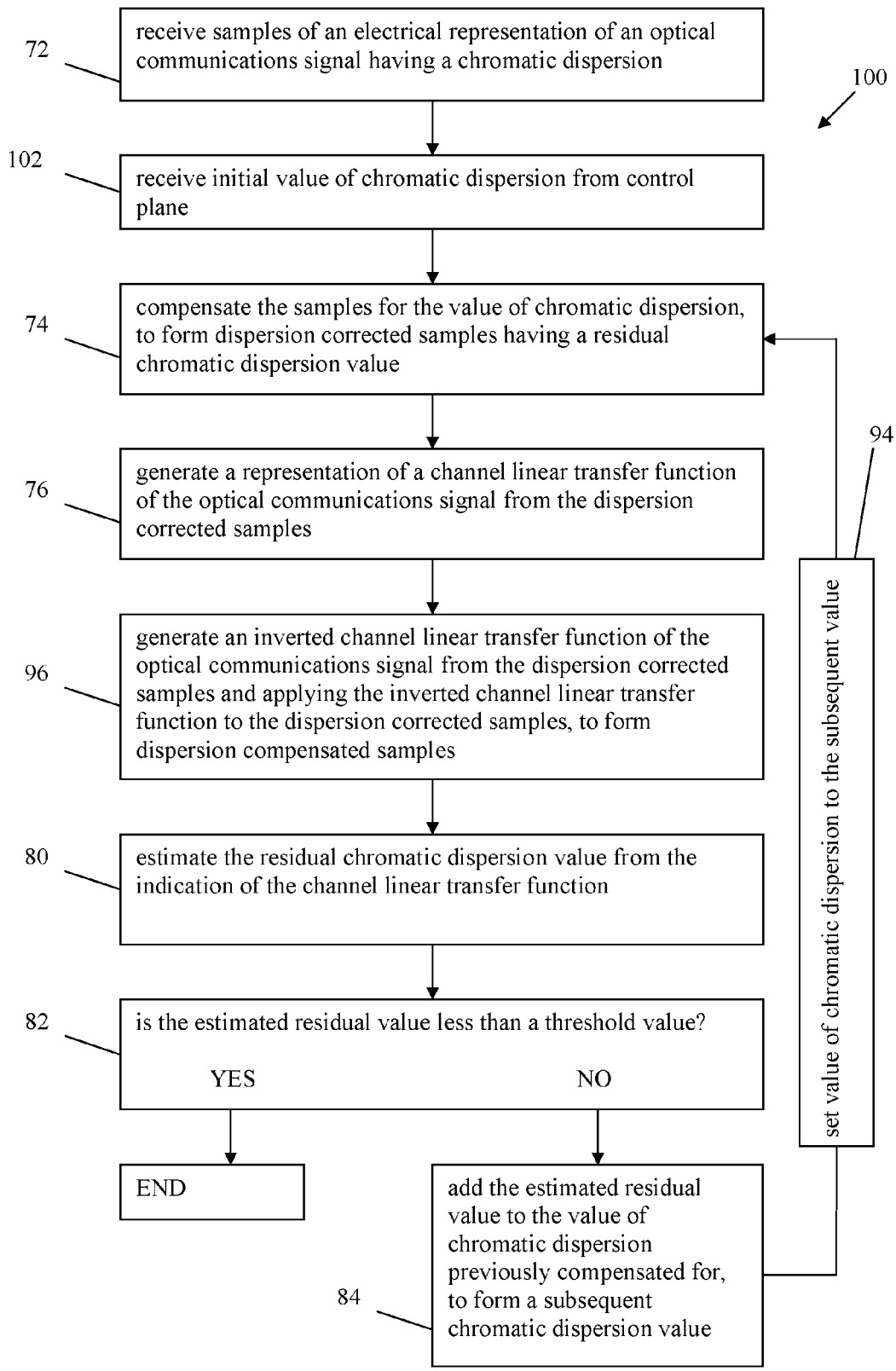
FIG. 11 shows the steps of a method according to an eight embodiment of the invention of processing chromatic dispersion of an optical communications signal.

FIG. 11 shows the steps of a method 100 according to an eighth embodiment of the invention of processing chromatic dispersion of an optical communications signal. The method 100 of this embodiment is similar to the method 90 of FIG. 9, with the following modifications. The same reference numbers are retained for corresponding features.

In this embodiment, the initial value of CD is a known CD of a link of an optical communications network from which the optical communications signal is received. The initial value of CD is received from the control plane of the communications network 102.

The initial value of CD may alternatively be a known minimum CD accumulated by the optical communications signal.

Figure 12:
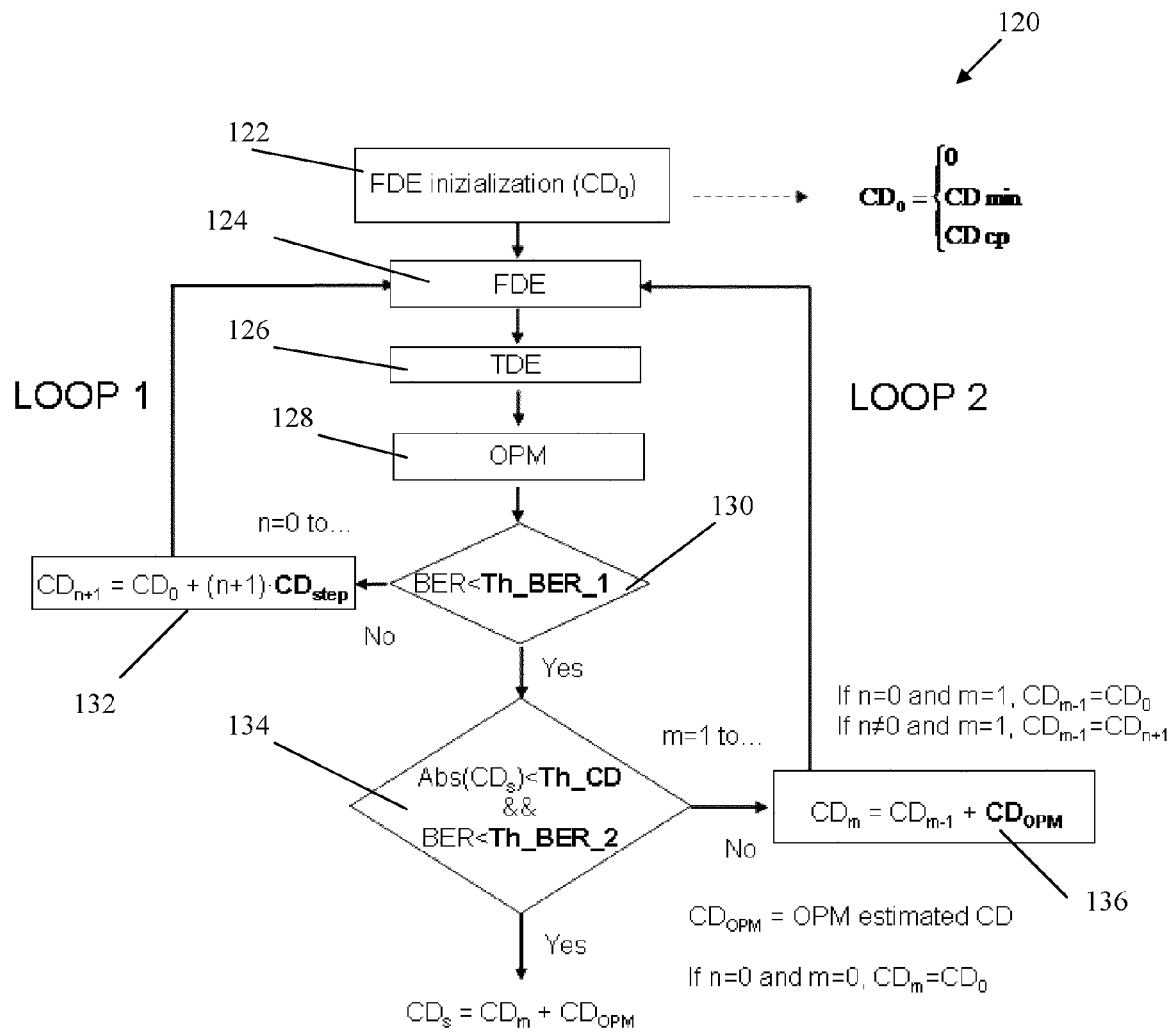
FIG. 12 shows the steps of a method according to a ninth embodiment of the invention of processing chromatic dispersion of an optical communications signal.

FIG. 12 shows the steps of a method 120 according to a ninth embodiment of the invention of processing chromatic dispersion of an optical communications signal. The method 120 of this embodiment is similar to the method 100 of FIG. 11, with the following modifications.

In this embodiment the method further comprises:
d. determining a BER of the dispersion compensated samples and comparing the BER to a first threshold BER (Th_BER_1) 130, and unless the BER is less than the first threshold BER, adding a preselected CD increment ($CD_{step}$) to the value of CD previously compensated for ($CD_0$), to form an incremented value of chromatic dispersion ($CD_{n+1}$) 132.

Steps b. to d. are repeated until the BER is less than the first threshold BER.

Step f. additionally comprises comparing the BER to a second threshold BER (Th_BER_2) 134. The estimated residual value ($CD_{OPM}$) is added to the value of CD previously compensated for ($CD_{m-1}$) 136, to form a subsequent value of CD ($CD_m$), unless the BER is less than the second threshold BER and the estimated residual CD value is less than the threshold value. In this example the threshold value is 10 ps/nm but it may be up to 50 ps/nm.

In the case of a longer link, with higher uncompensated CD, the TDE cannot converge. The OPM estimated residual CD value therefore is not significant and the equaliser loop of the methods 70, 90, 100 cannot be applied. The method 120 of this embodiment enables an advanced loop strategy to be adopted in order to maintain the use of a TDE having a low number of taps.

In this case the FDE is initialized 122 to $CD_0$ which can be either:
1. $CD_0$=0 ps/nm.
2. $CD_0$=$CD_{min}$ ps/nm.
3. $CD_0$=$CD_{cp}$ ps/nm.

Setting the initial CD value to 0 is the most general and blind approach. If the CD accumulated by the signal during propagation in the network can range between a known minimum ($CD_{min}$) and maximum value, the FDE can be initialized to $CD_{min}$. If the network control plane has a rough estimation of the link CD ($CD_{cp}$) the FDE can be initialized to $CD_{cp}$.

Steps b. to f. the FDE 124, TDE 126 and OPM 128 are then implemented as described above. If the BER is above a first threshold BER 130, this means that the TDE 126 cannot converge and the residual CD estimated by the OPM 128 is not a significant value. So a preselected increment of CD ($CD_{step}$) is added to the CD previously compensated for 132:

$$CD_{n+1}=CD_0+(n+1)CD_{step}$$

The FDE 124 is initialized to this new value of CD. The process is iterated, with each iteration causing the CD increment to be added to the CD value given to the FDE. This loop is repeated until the BER is less than the first BER threshold 130. Once this condition is met, a second check on the BER and on the estimated residual CD value determined by the OPM 128 is performed 134:

$$Abs(CD_s)<Th\_CD?$$

$$BER<Th\_BER\_2?$$

If the estimated residual CD ($Abs(CD_s)$) is above its threshold value or the BER is above a second BER threshold value, the estimated residual CD determined by the OPM 128 is added algebraically to the value given to the FDE 136:

$$CD_m=CD_{m-1}+CD_{OPM}$$

This loop is iterated until both the conditions are met. When both the BER and estimated residual CD are below their respective thresholds, the iteration stops. At this point the majority of the CD is compensated by the FDE, and the TDE is only required to compensate for a minimum CD quantity defined by the threshold value of the residual CD. The total compensated CD is the sum of the initial CD value given to the FDE plus the CD amount added during each iteration.

The CD increment value ($CD_{step}$) depends on the bit-rate, modulation format and number of taps in the TDE 126. In the case of a 108 Gbit/s PM-QPSK optical communications signal and a TDE with 5 taps, the CD increment must be below 1000 ps/nm. The first BER threshold is 0.48, which is the maximum BER value at which a receiver receiving the optical communications signal can see the constellation points of the signal. The first BER threshold is used to decide whether the estimated residual CD determined by the OPM. The second BER threshold is $1.0-10^{-3}$, which is the FEC limit. The second BER threshold is a stop condition for the iterations.

The smaller the CD threshold value, the greater is the amount of CD compensated for by the FDE, but more iterations are required. In this embodiment, the CD threshold is 10 ps/nm, which balances accuracy of the estimation of residual CD and the number of iterations required. For a 108 Gbit/s PM-QPSK signal and a TDE with 5 taps, 5-10 iterations are required for the TDE to converge on the CD threshold value of 10 ps/nm.

Figure 13:
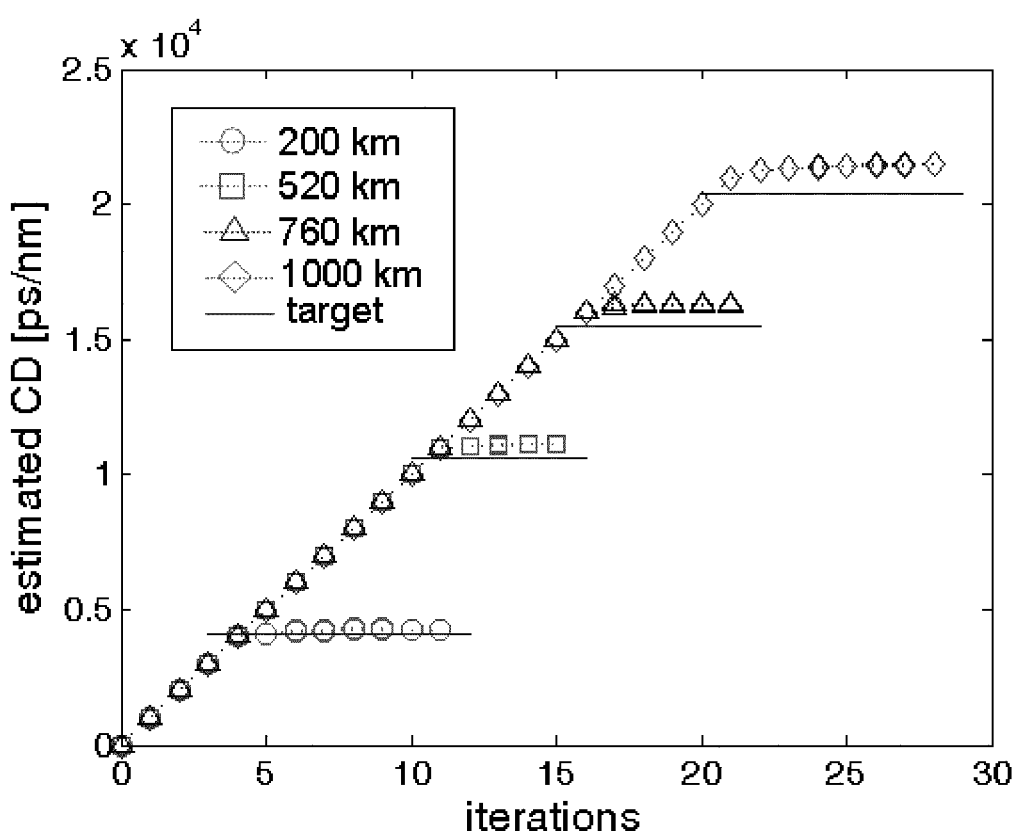
FIG. 13 shows the estimated residual CD as a function of the number of iterations of the method of FIG. 12.

FIG. 13 shows the estimated residual CD as a function of the number of iterations of the method 120 of FIG. 12. Propagation of the optical communications signal over four different distances prior to dispersion compensation are considered: 200 km (circles), 520 km (squares), 760 km (triangles) and 1000 km (diamonds). While the number of iterations in loop 1 of FIG. 12 is always below 9, the number of iterations in loop 2 of FIG. 12 linearly increases with the CD to be compensated for. The number of iterations in loop 1 and 2 can slightly change between subsequent applications of the method, but a maximum difference of 3 iterations has been observed. The iterations in loop 1 give a fixed CD increment of 1000 ps/nm and they are represented in FIG. 13 by the point on the straight inclined line. The iterations in loop 2 give a variable, smaller increment. The method 120 is observed to work well and to reach the target residual CD value in all the cases considered. The error between the nominal and the estimated residual CD is always below 5%.

Figure 14:
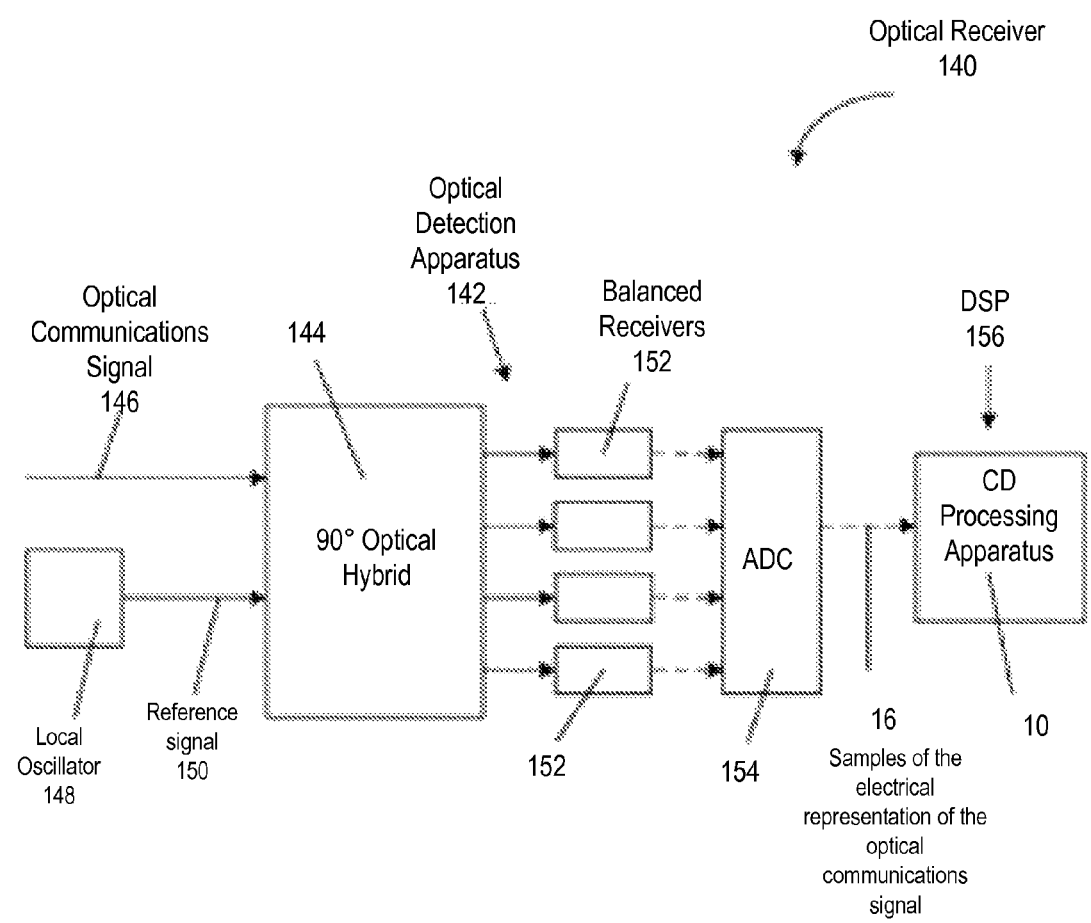
FIG. 14 is a schematic representation of an optical receiver according to a tenth embodiment of the invention.

A tenth embodiment of the invention provides an optical receiver 140 as shown in FIG. 14.

The optical receiver 140 comprises optical detection apparatus 142, analog to digital conversion (ADC) apparatus 154 and digital signal processing (DSP) apparatus 156.

The optical detection apparatus is arranged to receive an optical communications signal 146 and to generate an electrical representation of the optical communications signal. The optical detection apparatus 142 comprises a 90° optical hybrid 144 and four balanced receivers 152. The 90° optical hybrid 144 is arranged to receive the signal 146 and a reference signal 150 generated by a local oscillator 148. The construction and operation of this type of optical detection apparatus will be well known to the person skilled in the art and so further detail will not be given here.

The ADC apparatus 154 is arranged to sample electrical output signals received from the balanced receivers 152, to generate samples 16 of the electrical representation of the optical communications signal.

The DSP apparatus 156 comprises CD processing apparatus 10 as shown in FIG. 1. It will be appreciated that the CD processing apparatus 40 of FIG. 2, the CD processing apparatus 50 of FIG. 5, the CD processing apparatus 60 of FIG. 6, or the CD processing apparatus 160 of FIG. 7 may alternatively be used.

Figure 15:
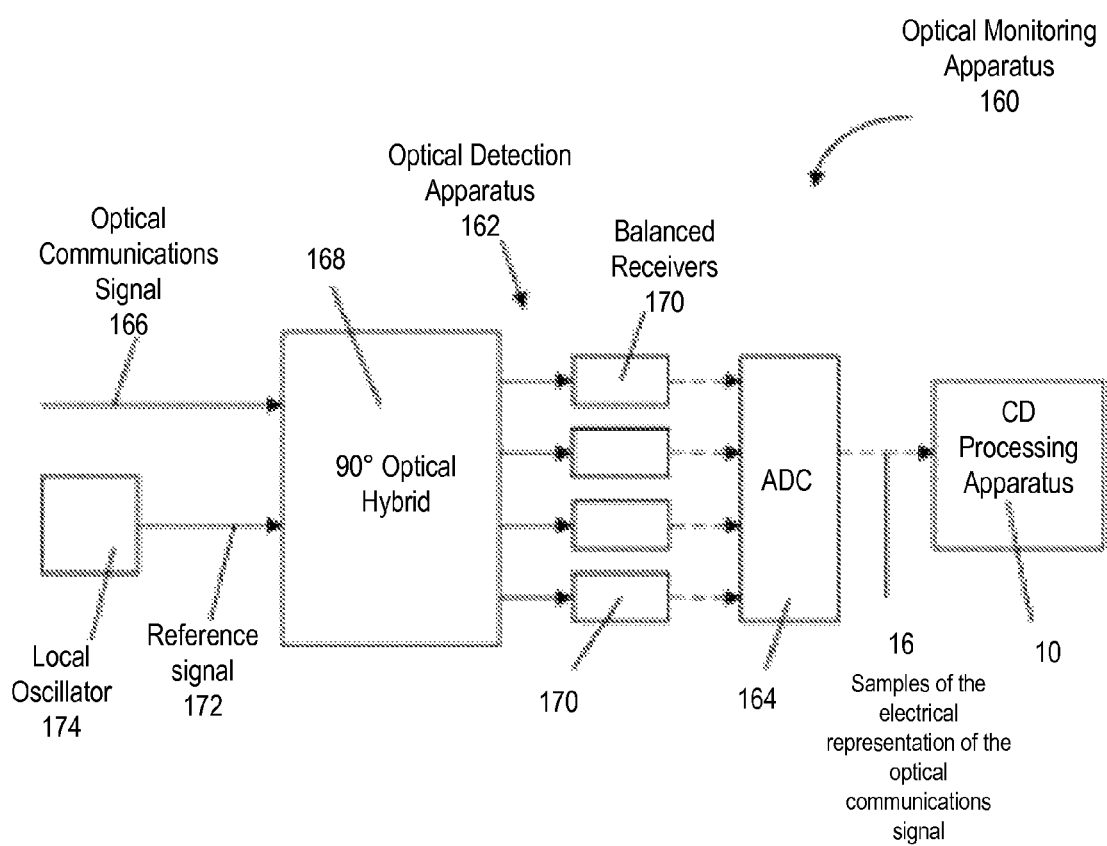
FIG. 15 is a schematic representation of optical monitoring apparatus according to an eleventh embodiment of the invention.

An eleventh embodiment of the invention provides optical monitoring apparatus 160 as shown in FIG. 15.

The optical monitoring apparatus 160 comprises optical detection apparatus 162, analog to digital conversion (ADC) apparatus 164 and CD processing apparatus 10 as shown in FIG. 1.

The CD processing apparatus 10 is arranged to estimate the CD of the optical communications signal. It will be appreciated that the CD processing apparatus 40 of FIG. 2, the CD processing apparatus 50 of FIG. 5, the CD processing apparatus 60 of FIG. 6, or the CD processing apparatus 160 of FIG. 7 may alternatively be used.

The optical detection apparatus is arranged to receive an optical communications signal 166 and to generate an electrical representation of the optical communications signal. The optical communications signal has been tapped of an optical communications traffic signal and is thus a portion that optical communications traffic signal, having a portion of the optical power of the optical communications traffic signal and carrying a replica of the traffic carried by it.

The optical detection apparatus 162 comprises a 90° optical hybrid 168 and four balanced receivers 170. The 90° optical hybrid 168 is arranged to receive the signal 166 and a reference signal 172 generated by a local oscillator 174. The construction and operation of this type of optical detection apparatus will be well known to the person skilled in the art and so further detail will not be given here.

The local oscillator 174 is a wavelength tunable local oscillator 174 arranged to generate a reference signal 172 at one of a plurality of pre-selected wavelengths, corresponding to the different wavelengths that the optical communications signal might have.

The ADC apparatus 154 is arranged to sample electrical output signals received from the balanced receivers 152, to generate samples 16 of the electrical representation of the optical communications signal.

The invention claimed is:

1. A chromatic dispersion processing apparatus comprising an equalizer loop comprising:
   a frequency domain equaliser arranged to receive samples of an electrical representation of an optical communications signal having a chromatic dispersion, and further arranged to apply chromatic dispersion compensation to the samples, to form dispersion corrected samples having a residual chromatic dispersion value;
   a time domain equaliser arranged to receive the dispersion corrected samples and to generate a representation of a channel linear transfer function of the optical communications signal from the dispersion corrected samples, and further arranged to generate and transmit a monitoring signal comprising the representation of the channel linear transfer function;
   an optical performance monitoring apparatus arranged to receive the monitoring signal and to estimate the residual chromatic dispersion value from the representation of the channel linear transfer function; and
   a processor arranged to receive the estimated residual value and to compare the estimated residual value to a threshold value, and further arranged to generate and transmit to the frequency domain equaliser an estimation signal comprising the estimated residual value unless the estimated residual value is less than the threshold value.

2. The chromatic dispersion processing apparatus as claimed in claim 1, wherein the time domain equaliser is arranged to generate an inverted channel linear transfer function of the optical communications signal from the dispersion corrected samples, and to apply the inverted channel linear transfer function to the dispersion corrected samples, to form dispersion compensated samples.

3. The chromatic dispersion processing apparatus as claimed in claim 1, wherein the time domain equaliser comprises a two-dimensional fractionally spaced feed forward equaliser having a number of taps in a range of 5 to 15.

4. The chromatic dispersion processing apparatus as claimed in claim 1, wherein the frequency domain equaliser is arranged to compensate the received samples for an initial value of chromatic dispersion, and is further arranged, in response to receipt of a-said estimation signal, to compensate the received samples for a subsequent value of chromatic dispersion, the subsequent value being a sum of the initial value and of a respective estimated residual value of said estimation signal and of each previously received estimation signal.

5. The chromatic dispersion processing apparatus as claimed in claim 4, wherein the initial value is one of 0 picsosecond (ps)/nanometer (nm), a known minimum chromatic dispersion accumulated by the optical communications signal, and a known chromatic dispersion of a link of an optical communications network from which the optical communications signal is received.

6. The chromatic dispersion processing apparatus as claimed in claim 1, wherein the chromatic dispersion processing apparatus further comprises:

a bit error rate monitoring apparatus arranged to determine a bit error rate of the dispersion compensated samples; and the processor is further arranged to receive the bit error rate and to compare the bit error rate to a first threshold bit error rate, and is further arranged to iteratively cause a preselected chromatic dispersion increment to be added to a value of chromatic dispersion previously compensated for unless the bit error rate is less than the first threshold bit error rate.

7. The chromatic dispersion processing apparatus as claimed in claim 6, wherein the processor is arranged, in response to the bit error rate being less than the first threshold bit error rate, to compare the bit error rate to a second threshold bit error rate, and is further arranged to generate and transmit the estimation signal comprising the estimated residual value unless the bit error rate is less than the second threshold bit error rate and the estimated residual value is less than the threshold value.

8. The chromatic dispersion processing apparatus as claimed in claim 1, wherein the threshold value is in a range of 10 picosecond (ps)/nanometer (nm) to 50 ps/nm.

9. A method of processing chromatic dispersion of an optical communications signal, the method comprising:
receiving samples of an electrical representation of an optical communications signal having a chromatic dispersion;
compensating the received samples for a value of chromatic dispersion, to form dispersion corrected samples having a residual chromatic dispersion value;
generating a representation of a channel linear transfer function of the optical communications signal from the dispersion corrected samples;
estimating the residual chromatic dispersion value from the representation of the channel linear transfer function;
comparing the estimated residual value to a threshold value and unless it is less than the threshold value, adding the estimated residual value to a value of chromatic dispersion previously compensated for, to form a subsequent value of chromatic dispersion; and
repeating the compensating, generating, estimating, and comparing operations for respective subsequent values of chromatic dispersion until the estimated residual value is less than the threshold value.

10. The method as claimed in claim 9, wherein generating the representation of the channel linear transfer function further comprises generating an inverted channel linear transfer function of the optical communications signal from the dispersion corrected samples, and applying the inverted channel linear transfer function to the dispersion corrected samples, to form dispersion compensated samples.

11. The method as claimed in claim 9, wherein generating the representation of the channel linear transfer function is implemented using a time domain equaliser comprising a two-dimensional fractionally spaced feed forward equaliser having a number of taps in a range of 5 to 15.

12. The method as claimed in claim 9, wherein a value of chromatic dispersion used in an initial implementation of the compensating operation is one of 0 picosecond (ps)/nanometer (nm), a known minimum chromatic dispersion accumulated by the optical communications signal, and a known chromatic dispersion of a link of an optical communications network from which the optical communications signal is received.

13. The method as claimed in claim 9, further comprising: determining a bit error rate of the dispersion compensated samples and comparing the bit error rate to a first threshold bit error rate, and unless the bit error rate is less than the first threshold bit error rate, adding a preselected chromatic dispersion increment to a value of chromatic dispersion previously compensated for, to form an incremented value of chromatic dispersion, and repeating the compensating, generating, and determining operations until the bit error rate is less than the first threshold bit error rate.

14. The method as claimed in claim 13, wherein the comparing operation further comprises comparing the bit error rate to a second threshold bit error rate and the estimated residual value is added to the value of chromatic dispersion previously compensated for, to form a subsequent value of chromatic dispersion, unless the bit error rate is less than the second threshold bit error rate and the estimated residual value is less than the threshold value.

15. The method as claimed in claim 9, wherein the threshold value is in a range of 10 picosecond (ps)/nanometer (nm) to 50 ps/nm.

16. An optical monitoring apparatus comprising:
an optical detection apparatus arranged to receive an optical communications signal and to generate an electrical representation of the optical communications signal;
an analog to digital conversion apparatus arranged to generate samples of the electrical representation; and
a chromatic dispersion processing apparatus comprising an equalizer loop comprising:
a frequency domain equaliser arranged to receive samples of an electrical representation of an optical communications signal having a chromatic dispersion, and further arranged to apply chromatic dispersion compensation to the samples, to form dispersion corrected samples having a residual chromatic dispersion value;
a time domain equaliser arranged to receive the dispersion corrected samples and to generate a representation of a channel linear transfer function of the optical communications signal from the dispersion corrected samples, and further arranged to generate and transmit a monitoring signal comprising the representation of the channel linear transfer function;
an optical performance monitoring apparatus arranged to receive the monitoring signal and to estimate the residual chromatic dispersion value from the representation of the channel linear transfer function; and
a processor arranged to receive the estimated residual value and to compare the estimated residual value to a threshold value, and further arranged to generate and transmit to the frequency domain equaliser an estimation signal comprising the estimated residual value unless the estimated residual value is less than the threshold value.

17. An optical receiver comprising:
an optical detection apparatus arranged to receive an optical communications signal and to generate an electrical representation of the optical communications signal;
an analog to digital conversion apparatus arranged to generate samples of the electrical representation; and
a digital signal processing apparatus comprising a chromatic dispersion processing apparatus comprising an equalizer loop comprising:
a frequency domain equaliser arranged to receive samples of an electrical representation of an optical communications signal having a chromatic dispersion, and further arranged to apply chromatic dispersion compensation to the samples, to form dispersion corrected samples having a residual chromatic dispersion value;

a time domain equaliser arranged to receive the dispersion corrected samples and to generate a representation of a channel linear transfer function of the optical communications signal from the dispersion corrected samples, and further arranged to generate and transmit a monitoring signal comprising the representation of the channel linear transfer function;

an optical performance monitoring apparatus arranged to receive the monitoring signal and to estimate the residual chromatic dispersion value from the representation of the channel linear transfer function; and a processor arranged to receive the estimated residual value and to compare the estimated residual value to a threshold value, and further arranged to generate and transmit to the frequency domain equaliser an estimation signal comprising the estimated residual value unless the estimated residual value is less than the threshold value.

18. A non-transitory computer-readable storage medium having computer code stored therein, which when executed by a processor, cause the processor to perform operations comprising:

receiving samples of an electrical representation of an optical communications signal having a chromatic dispersion;

compensating the received samples for a value of chromatic dispersion, to form dispersion corrected samples having a residual chromatic dispersion value;

generating a representation of a channel linear transfer function of the optical communications signal from the dispersion corrected samples;

estimating the residual chromatic dispersion value from the representation of the channel linear transfer function;

comparing the estimated residual value to a threshold value and unless it is less than the threshold value, adding the estimated residual value to a value of chromatic dispersion previously compensated for, to form a subsequent value of chromatic dispersion; and repeating the compensating, generating, estimating, and comparing operations for respective subsequent values of chromatic dispersion until the estimated residual value is less than the threshold value.

\* \* \* \* \*